(12) United States Patent
Woolgar-O'Neil et al.

(10) Patent No.: US 11,757,916 B1
(45) Date of Patent: Sep. 12, 2023

(54) METHODS AND APPARATUS FOR ANALYZING AND SCORING DIGITAL RISKS

(71) Applicant: Digital Shadows Ltd., London (GB)

(72) Inventors: Bryan Woolgar-O'Neil, Cambridge (GB); Laura Elizabeth Aylward, London (GB); Robert Alexander Campbell, London (GB); Russell James Bentley, Bristol (GB); Thomas Edward Hoskin, Kingston Upon Thames (GB); Abhay Arvind Shete, London (GB); Benjamin Raymond Gilbert, London (GB); Georgios Louis Promponas, London (GB); Thomas Arthur Wedge, Southampton (GB); Attila Szasz, London (GB); Christos Rigas, London (GB); James David Cockrill, Essex (GB); Soyeb Moinuddin Shaikh, Hertfordshire (GB)

(73) Assignee: DIGITAL SHADOWS LTD., London (GB)

(*) Notice: Subject to any disclaimer, the term of this patent is extended or adjusted under 35 U.S.C. 154(b) by 416 days.

(21) Appl. No.: 16/916,912

(22) Filed: Jun. 30, 2020

Related U.S. Application Data

(60) Provisional application No. 62/871,602, filed on Jul. 8, 2019, provisional application No. 62/871,598, filed (Continued)

(51) Int. Cl.
*H04L 29/06* (2006.01)
*H04L 9/40* (2022.01)
(Continued)

(52) U.S. Cl.
CPC ..... *H04L 63/1433* (2013.01); *G06Q 10/0635* (2013.01); *H04L 9/0643* (2013.01); *H04L 61/4511* (2022.05); *H04L 63/1441* (2013.01)

(58) Field of Classification Search
None
See application file for complete search history.

(56) References Cited

U.S. PATENT DOCUMENTS

| 2018/0189697 | A1 | 7/2018 | Thomson et al. |
| 2019/0096217 | A1* | 3/2019 | Pourmohammad ..... G06F 40/30 |
| 2020/0099716 | A1* | 3/2020 | Sjouwerman ....... H04L 63/1416 |

* cited by examiner

Primary Examiner — William J. Goodchild
(74) Attorney, Agent, or Firm — Brian J. Colandreo; Jeffery T. Placker; Holland & Knight LLP

(57) ABSTRACT

In some implementations, a method includes receiving an input domain name and generating a normalized domain name based on the input domain name. The normalized domain name including at least one of an internationalized domain name (IDNA) or a Unicode domain name that is converted from puny code characters in the input domain name. The method also includes determining whether the input domain name is excluded from domain impersonation analysis based on the normalized domain name and risk configuration data associated with an entity. In the event that the input domain name is not excluded from domain impersonation analysis, the method further includes calculating a confidence score representing a risk of domain impersonation to the entity, calculating the confidence score including at least one of: i) analyzing a typo-squat in the input domain name; or ii) analyzing a combo-squat in the input domain name.

7 Claims, 28 Drawing Sheets

Related U.S. Application Data on Jul. 8, 2019, provisional application No. 62/871,601, filed on Jul. 8, 2019.

(51) Int. Cl.
*G06Q 10/0635* (2023.01)
*H04L 9/06* (2006.01)
*H04L 61/4511* (2022.01)

METHODS AND APPARATUS FOR ANALYZING AND SCORING DIGITAL RISKS

CROSS-REFERENCE TO RELATED APPLICATIONS

This application claims priority to and the benefit of U.S. Provisional Application No. 62/871,598, filed Jul. 8, 2019 and titled "Methods and Apparatus for Identifying and Calculating Confidence of Domain Name Impersonation"; U.S. Provisional Application No. 62/871,601, filed Jul. 8, 2019 and titled "Methods and Apparatus for Detecting Online Documents Marked in Accordance with an Organization's Protective Marking Scheme"; and U.S. Provisional Application No. 62/871,602, filed Jul. 8, 2019 and titled "Methods and Apparatus for Analyzing and Scoring Digital Risks", each of which is incorporated herein by reference in its entirety.

BACKGROUND

The embodiments described herein relate generally to analyzing and scoring of digital risks, and more particularly, to apparatus and methods for scoring digital risks taking into account the risk likelihood and risk impact.

Increases in the availability and capability of electronic devices (e.g., personal computers, tablets, smartphones, etc.) significantly improve the convenience of electronic and online transactions, but they also lead to potential exposure to various types of digital risks. For a business entity, these digital risks may include counterfeit electronic documents, domain impersonation, and leakage of confidential business data, among others. Each type of digital risk, however, may pose different degrees of threat to a business entity because, for example, the asset that might be affected by the threat may have different values to different business entities. Various other factors may also affect the degrees of threat. Therefore, a need exists for improved apparatus and methods to analyze, score, and monitor digital risks for business entities such that they can take corresponding preventive or remedial measures.

Moreover, while online transactions have gained increasing popularity over recent years, they also induce increased risk of domain name impersonation to business entities. For example, a company can use "CompanyName.com" as its website address. Cyber squatters can take advantage of this pattern by registering domain names that are similar to the authentic domain name and then carrying out damaging activities to the company, such as phishing, diverting Internet traffic intended for the company, or selling counterfeit products bearing the brand of the company. Thus, a need exists for apparatus and methods that can quantitatively and comprehensively assess the risk of domain name impersonation for business entities.

Further, while increases in the availability and capability of electronic devices (e.g., personal computers, tablets, smartphones, etc.) significantly improves the convenience of information dissemination, such as file downloading, file sharing, and instant messaging, this also leads to increased risk of inadvertent information leakage, unauthorized disclosure of protected documents, and document forging. A business entity may employ one or more protective marking schemes to mark its internal documents so as to protect the content of the documents. A need exists for improved apparatus and methods to detect online documents marked in accordance with an entity's protective marking scheme such that the entity can take corresponding preventive or remedial measures.

SUMMARY

In some implementations, a method includes receiving information associated with a digital risk and retrieving data based on the information associated with the digital risk. The data includes: (i) a business value of an asset related to the digital risk; (ii) an attribute of an entity affected by the digital risk; and (iii) nature and confidence information associated with detection of the digital risk. The method also includes calculating, using a processor, a risk score based on the retrieved data. Calculating the risk score includes calculating a risk likelihood score based on the nature and confidence information associated with the detection of the digital risk and calculating a risk impact score based on: (i) a likely threat score (LTS) representing a likelihood that a threat associated with the digital risk occurs; and (ii) an asset threat score (ATS) representing a consequence of an occurrence of the threat. Calculating the risk score also includes calculating the risk score based on the risk likelihood score and the risk impact score.

In some implementations, a method includes receiving an input domain name and generating a normalized domain name based on the input domain name. The normalized domain name including at least one of an internationalized domain name (IDNA) or a Unicode domain name that is converted from puny code characters in the input domain name. The method also includes determining whether the input domain name is excluded from domain impersonation analysis based on the normalized domain name and risk configuration data associated with an entity. In the event that the input domain name is not excluded from domain impersonation analysis, the method further includes calculating a confidence score representing a risk of domain impersonation to the entity, calculating the confidence score including at least one of: i) analyzing a typo-squat in the input domain name; or ii) analyzing a combo-squat in the input domain name.

In some implementations, a method includes receiving an input document and generating a normalized document based on the input document. The normalized document includes a portable document format (PDF) copy of the input document, metadata of the input document, and a secure hash algorithm (SHA) hash of the document. The method also includes determining whether the input document is excluded from marking detection by comparing the metadata of the input document or the SHA hash of the input document with risk configuration data. In the event that the input document is not excluded from marking detection, the method includes identifying, based on asset data, a protective marking in the input document and an entity associated with the protective marking. The method further includes generating a risk detection signal based on the identification of the protective marking and the entity associated with the protective marking.

DETAILED DESCRIPTION

Figure 1:
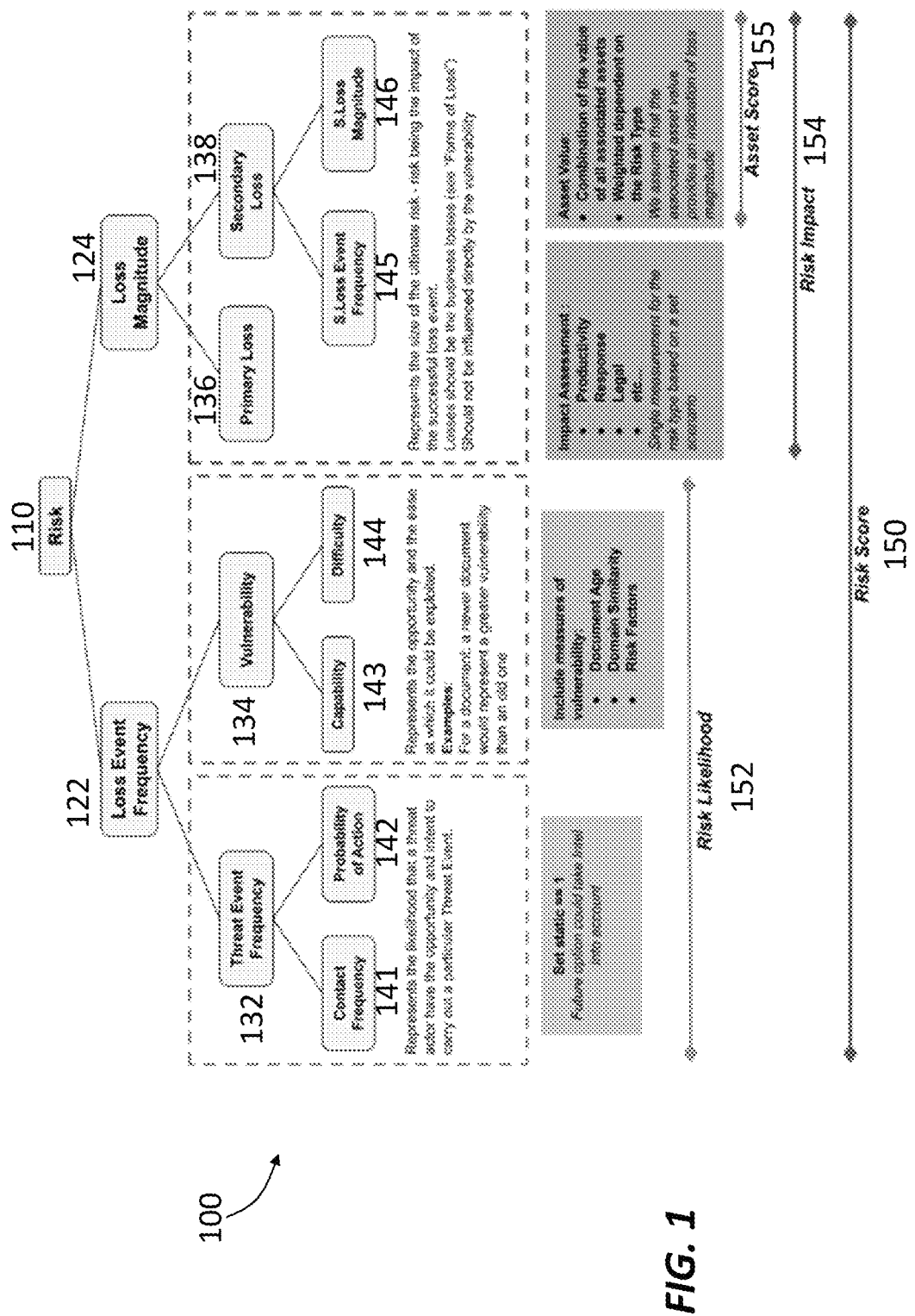
FIG. 1 is a schematic illustration of a scoring topology for digital risks, according to an embodiment.

FIG. 1 is a schematic illustration of a scoring topology 100 for digital risks, according to an embodiment. In this topology 100, a digital risk 110 to an entity includes two aspects: a loss event frequency 122 and a loss magnitude 124. The loss event frequency 122 further includes threat event frequency 132 and vulnerability 134. The threat event frequency 132 represents the likelihood that a threat actor has the opportunity and intent to carry out a particular threat event associated with the digital risk. Accordingly, analyzing the threat event frequency 132 can be achieved by further analyzing a contact frequency 141 and a probability of action 142. The contact frequency 141 represents the opportunity for the threat actor to have contact with the entity, and the probability of action 142 represents the probability for the threat actor to actually carry out activities that materialize the threat.

The vulnerability 134 represents the opportunity and the ease at which the entity might be exploited. Analyzing the vulnerability 134 can further include analyzing capability 143 and difficulty 144. In some embodiments, the capability 143 can represent the skill level of attackers to exploit vulnerabilities, and difficulty 144 represents the difficulty for the attackers to actually exploit such vulnerabilities. For example, if the attacker is not skillful in carrying out certain attacks, the vulnerability 134 might not be very high even if the vulnerability would generally be easy to attack. In some instances, for example, the digital risk 110 includes a leaked document that bears the protective marking of a client company (e.g., document leaked to a competitor to the client company). In these instances, the capability 143 can represent how likely the competitors are to understand and act on the information in the leaked document, and the difficulty 144 can represent how difficult it is for the competitor to exploit the information by, for example, creating new data sheets, changing a pricing model, etc. In some instances, for example, the digital risk 110 includes a counterfeit document that has markings purportedly made by the entity. Generally, the vulnerability 134 of a newer document is greater than the vulnerability 134 of an older document. In other words, the age of the document is one factor that affects the vulnerability 134. In some embodiments, the digital risk 110 includes domain impersonation, in which case the domain similarity can affect the vulnerability 134.

The loss magnitude 124 includes primary loss 136 and secondary loss 138. In some embodiments, the primary loss 136 can include losses induced directly by the occurrence of the threat associated with the digital risk 110. For example, the primary loss 136 of domain impersonation can include the loss of revenue due to the diversion of customers. In some embodiments, the secondary loss 138 can include consequential losses caused by the occurrence of the threat associated with the digital risk 110. For example, the secondary loss 138 of domain impersonation can include damages to the reputation and goodwill of the business entity. In some embodiments (as illustrated in FIG. 1), the secondary loss 138 can be estimated by considering the secondary loss event frequency 145 and secondary loss magnitude 146. In other words, estimating the secondary loss 138 can be conducted in a similar manner as in analyzing the digital risk 110, which takes into account the loss event frequency 122 and the loss magnitude 124.

In some embodiments, the loss magnitude 124 can represent the size of the ultimate threat, i.e., the consequence of a loss event caused by the threat. As shown in FIG. 1, in some instances the loss magnitude 124 is not influenced directly by the vulnerability 134.

In some embodiments, the loss magnitude 124 depends on the value of asset that can be affected by the digital risk 110. In some embodiments, one digital risk 110 can causes losses to more than one asset. In these embodiments, the loss magnitude 124 includes the total value of the assets that might be affected. In some embodiments, the loss magnitude 124 includes a weighted combination of the values of the assets that might be affected. The weight attached to the value of each asset depends on, for example, the type of the digital risk 110.

In some embodiments, analyzing the digital risk 110 can be achieved by quantifying various parameters illustrated in FIG. 1 and described above. For example, the digital risk 110 can be quantified by an overall risk score 150. Calculating the risk score 150 can be based on calculating a risk likelihood score 152 and a risk impact score 154. The risk likelihood score 152 quantifies the loss event frequency 122 and the risk impact score 154 quantifies the loss magnitude 124. In addition, the risk impact score 154 can be calculated by calculating an asset score 155 that quantifies the asset value.

Figure 2:
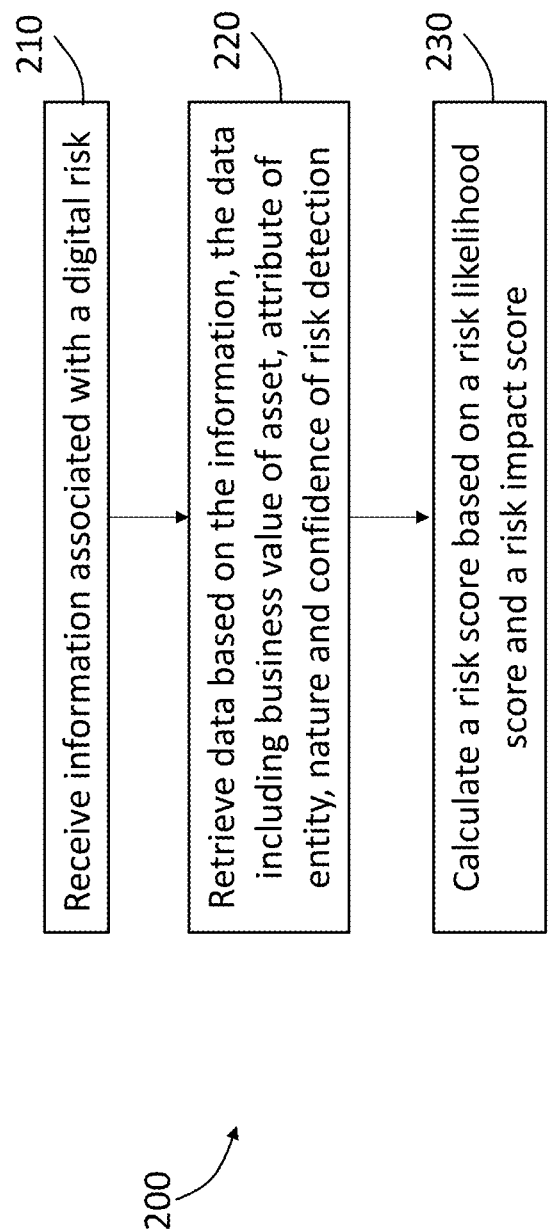
FIG. 2 is a flowchart illustrating a method of analyzing and scoring digital risks, according to an embodiment.

FIG. 2 is a flowchart illustrating a method 200 of analyzing and scoring a digital risk, according to an embodiment. The method 200 includes, at 210, receiving information associated with a digital risk. For example, in assessing the digital risk of document marking, the information received at 210 can include the suspect document itself. In another example, in domain impersonation, the information received at 210 can include the suspect domain name, the content of the domain name, the Internet Protocol (IP) address associated with the suspect domain name, and/or the Medial Access Control (MAC) address associated with the suspect domain name. In some embodiments, the information received at 210 can also include information about potential entities that might be affected by the digital risk.

The method 200 also includes, at 220, retrieving data based on the information received at 210. The retrieved data include: (i) a business value of an asset related to the digital risk; (ii) an attribute of an entity affected by the digital risk; and (iii) nature and confidence information associated with detection of the digital risk. In some embodiments, the nature and confidence information includes the level of similarity an impersonating domain has with a client's own domain (e.g., in domain impersonation analysis). In some embodiments, the nature and confidence information includes the type of protective marking that has been identified in the document (e.g., in document marking analysis).

In some embodiments, one or more databases are used to store the data retrieved at 220. For example, the method 200 can be performed by a service provider for clients who are business entities. The service provider can operate and manage a central server that stores information about its clients. The stored information can include, for example, nature and scope of business conducted by clients, assets owned by clients, values of the assets owned by clients, internal procedures employed by clients for risk detection and control, and an indication of parties who conduct business with clients (e.g., suppliers, customers, vendors, distributors, etc.), among others.

In some embodiments, part of the data retrieved at 220 can be received from clients. For example, after receiving information about a digital risk, the service provide may determine that more information is needed from the client which might be affected by the digital risk. In some instances, the digital risk can affect business entities that are not clients of the service provider. In these instances, the service provider can send a message to those business entities and offer the risk analysis/scoring service to those business entities.

In some embodiments, the service provider can automatically collect (e.g., using a server) information at 210. For example, the service provider can search for any digital risk that might affect its client. In some instances, such search can be conducted over the entire Internet. In some instances, the search can be more targeted. For example, in domain impersonation analysis, the search can be focused on registered domain names.

The method 200 also includes, at 230, calculating, using a processor, a risk score based on the retrieved data. The step 230 can further include several actions, including calculating a risk likelihood score based on the nature and confidence information associated with the detection of the digital risk, calculating a risk impact score based on: (i) a likely threat score (LTS) representing a likelihood that a threat associated with the digital risk occurs; and (ii) an asset threat score (ATS) representing a consequence of an occurrence of the threat, and calculating the risk score based on the risk likelihood score and the risk impact score. In some embodiments, the calculated risk score can be used to automate remedial actions. For example, impersonating domains with a high risk score can be automatically blocked at the client's network boundary, and/or impersonating domains with a low risk score (e.g., below a predetermined threshold value) can be monitored without blocking.

In some embodiments, the risk impact score can be calculated according to the formula: risk impact score=$ATS \times AW + LTS \times RIW$, where AW is an asset weight and RIW is risk impact weight. In some embodiments, both the asset weight AW and the risk impact weight RIW can be 0.5 for analyzing document marking and domain impersonation. In some implementations, the weights AW and RIW can be determined by manually applying a scenario based impact assessment to each type of digital risk. In some implementations, the weights can be static and set as part of an offline activity. In some implementations, the weights can be dynamic and/or static, and can be set and/or revised using any suitable criteria.

In some embodiments, calculation of the LTS can take into account the attribute of the entity affected by the digital risk. The attribute of the entity can include the nature and scope of businesses conducted by the entity. For example, in analyzing domain impersonation, business entities that conduct little online transactions can have a lower LTS (e.g., because potential actors have little interest/gain from such impersonation).

In some embodiments, calculation of the LTS can take into account the type of risk and the asset that might be affected by the risk. For example, in analyzing document markings, the age of the suspect document can be a factor, i.e., the newer the document, the higher the LTS.

In some embodiments, the ATS can be calculated based at least on: (i) a criticality score associated with the asset (AScr); (ii) a sensitivity score associated with the asset (ASsen); and (iii) a cost score associated with the asset (AScst). For example, the ATS can be calculated according to the formula: $ATS=(TAWcr \times AScr)+(TAWsen \times ASsen)+(TAWcst \times AScst)$, where TAWcr is a first weight, TAWsen is a second weight, and TAWcst is a third weight. Such weights can be defined similar to the asset weight AW and the risk impact weight RIW discussed above. The criticality score represents how critical the asset to the business entity. For example, the domain name of an online vendor can be very critical to the vendor. The sensitivity score can represent the sensitivity of the business entity to the risk. For example, a business entity has a high level of sensitivity to a counterfeit document that might include trade secret of the entity. In contrast, the same business entity can have a low sensitivity to a counterfeit document disclosing information that is already published (e.g., quarterly report). In another example, a document marked as "Top Secret" can be more sensitive than a document marked "Restricted". The cost score represents losses to the entity (e.g., monetary losses) in the event that the threat associated with the digital risk actually occurs.

In some embodiments, the weight numbers used in the method 200 can be stored in one or more databases operatively coupled to the processor. Therefore, when calculating the risk score, the processor can retrieve the weight numbers from the database.

In some embodiments, method 200 further includes comparing the risk score with other risk scores of previous digital risks stored in a database, the other risk scores being related to the entity. For example, the method 200 can be used to monitor the same digital risk posed to a business entity. Risk scores calculated from previous detections of the same digital risk are stored in a memory. When a new risk score is calculated, the processor compares the new score with the stored scores. In the event that the new risk score is different from previous scores, the processor is configured to update the database.

In some embodiments, in the event that the new risk score is different from previous risk scores, the processor is configured to generate a flag, such as a "Risk Superseded" flag or a "True" flag to indicate that the risk score has changed. In some embodiments, the processor can be configured to send the calculated risk score to the corresponding business entity, i.e., the business entity whose attribute is used to calculate the risk score. In some embodiments, the digital risk can be related to multiple business entities, and the method 200 is used to calculate a risk score for each business entity and send each calculated risk score to the corresponding business entity. In these embodiments, each digital risk can, for example, relate to a single client. In some instances, if the same online content poses a risk to two different clients, two different digital risks scores can be calculated. In some instances, if the same online content poses a risk to two different clients, a single composite digital risk score can be calculated for the two different clients.

The method 200 can be used to analyze and score various types of digital risks. In some embodiments, the method 200 can be used to analyze and score digital risks related to online brand security, including, among others, domain impersonation, webpage phishing activities (e.g., for credentials of credit card, online accounts, etc.), webpages serving malicious content, webpages misusing the brand of an entity, known version of legitimate application software (APP) on unofficial store, identification of unauthorized modifications of legitimate APP, identification of APP that attempts to impersonate client brand, unauthorized sharing of sensitive information on social media, unregistered social profile using company name or brand, and/or unregistered social profile using very important person (VIP) names.

In some embodiments, the method 200 can be used to analyze and score digital risks so as to achieve reduction of attack surfaces (i.e., to reduce attacks). These risks can include, for example, certificate expiration, use of clear text authentication protocols, exposed service that provides a guest or default user access to a system, detection of open file storage, identification of vulnerable service on port, and identification of weak or insecure SSL/TLS configurations.

In some embodiments, the method 200 can be used to analyze and score digital risks related to data loss detection. For example, the method 200 can be used to analyze a suspect document that bears counterfeit markings of a business entity (e.g., counterfeit contract, counterfeit security certificate, counterfeit checks, etc.). These digital risks can also include risks related to, for example, customer account credential, employee account credential, online file stores hosting corporate documentation, internal system access codes, corporate accounts used to post to public code repository, identifiable corporate code on public websites, customer system access codes, employee personal data, and/or customer personal data.

FIGS. 3A-3G illustrate a method 300 of analyzing and scoring digital risks related to a document marking, according to an embodiment. The method 300 can be used to, for example, analyze a suspect document that might bear counterfeit markings that are purportedly in accordance with an entity's protective marking scheme. The resulting risk score generated by the method 300 can be used to advise the entity to take preventive and/or remedial measures. In some implementations, the risk score can trigger the entity to take the preventive/remedial measures. For example, the business entity can contact its business parties that might be affected by a counterfeit document identified by the method 300. The business entity may also choose to report the incident to law enforcement. In some embodiments, the affected business entity can submit a takedown request based on Digital Millennium Copyright Act (DMCA) when copyrighted material is identified. In some embodiments, the affected business entity (e.g., the system operated by the affected business entity) can automatically reset passwords via active directory when employee credentials are identified online. In some implementations, the method 300 can be used with the systems and methods shown and described with respect to FIGS. 12-15 to calculate and/or determine a risk score for document marking.

Figure 3A:
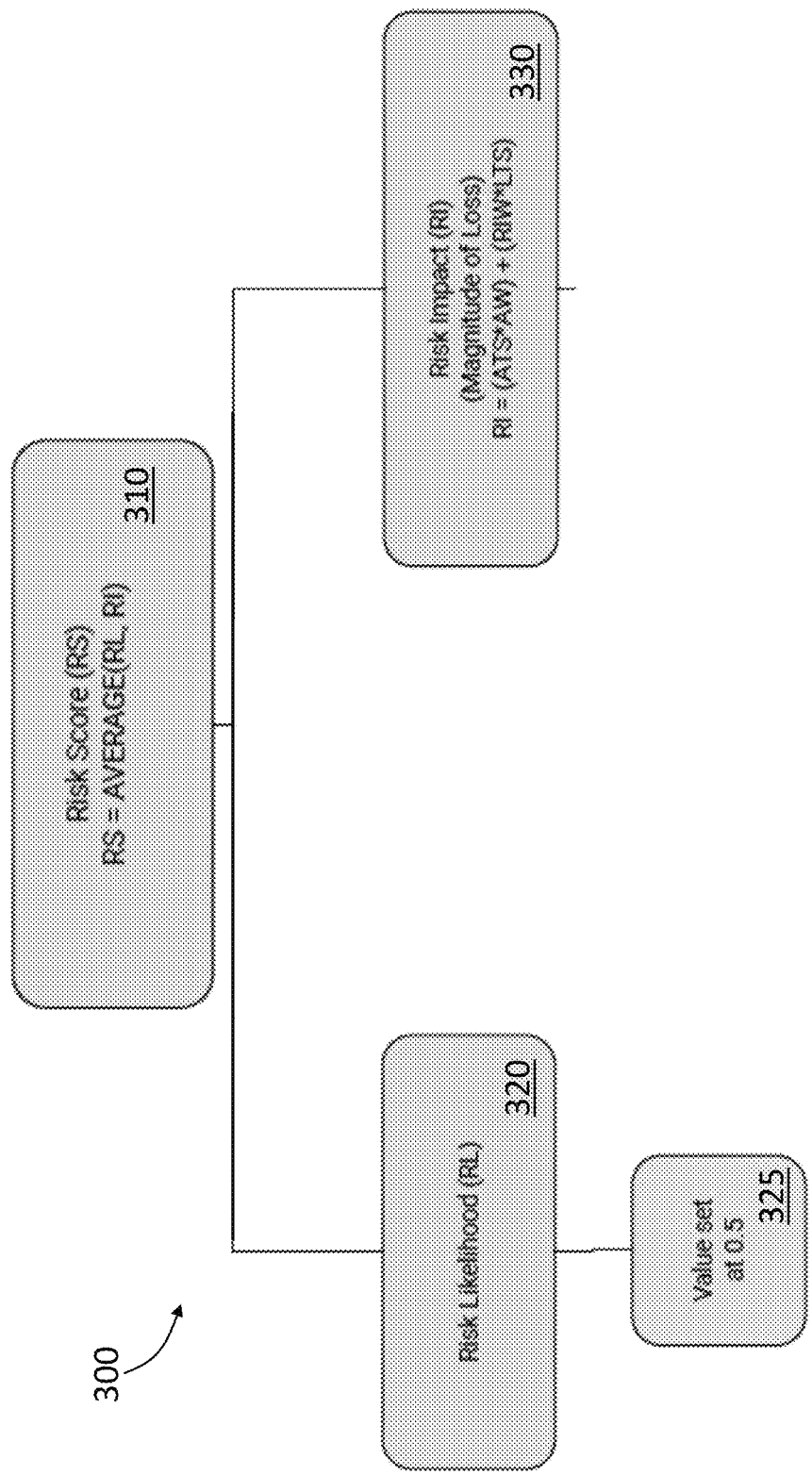
FIGS. 3A-3G illustrate a method of analyzing and scoring digital risks related to document marking, according to an embodiment.

FIG. 3A shows that a risk score 310 is calculated by averaging a risk likelihood score 320 and a risk impact score 330, i.e., risk score=average (risk likelihood score, risk impact score). In a more general form, risk score=risk likelihood score×first weight 325+risk impact score×second weight (not shown in FIG. 3A). In FIG. 3A, the first weight 325 and the second weight are both 0.5. In some implementations, any other suitable weights can be used and such weights can be defined based on different digital risk types and/or categories.

Figure 3B:
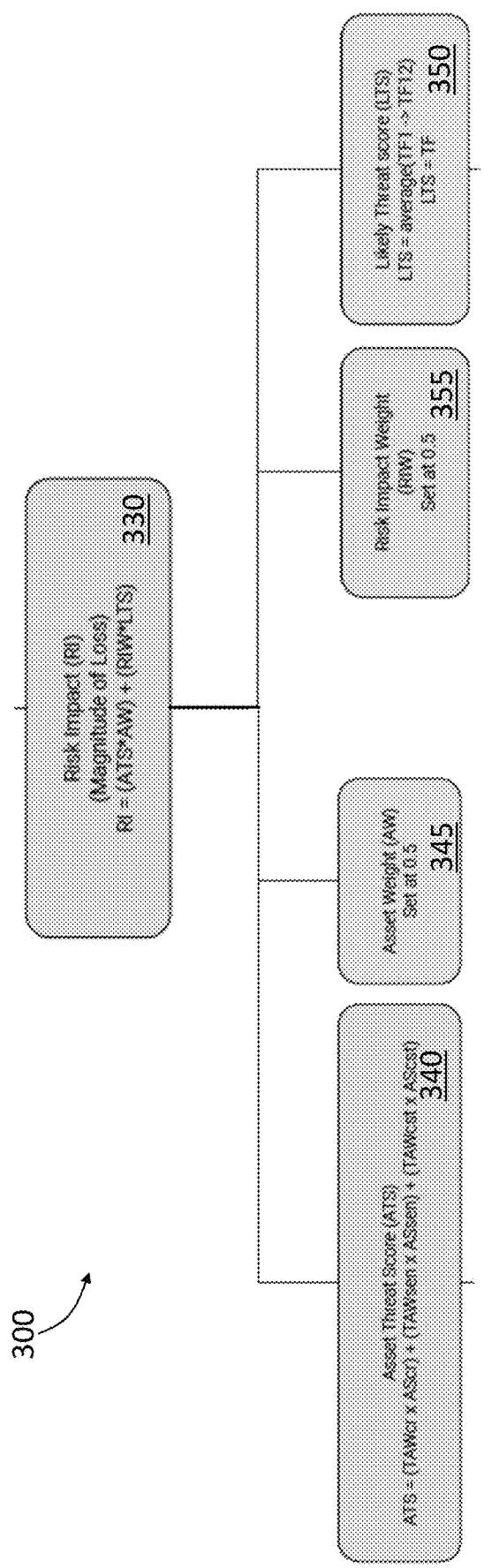

FIG. 3B shows that the risk impact score 330 is calculated by a weighted sum of an asset threat score (ATS) 340 and a likely threat score (LTS) 350, i.e., risk impact score=(ATS×AW)+(RIW×LTS), where AW is an asset weight 345 and RIW is a risk impact weight 355. In some implementations, the asset weight 345 and the risk impact weight 355 are both 0.5 for document marking analysis. In some implementations, any other suitable weights can be used and such weights can be defined based on different digital risk types and/or categories.

Figure 3C:
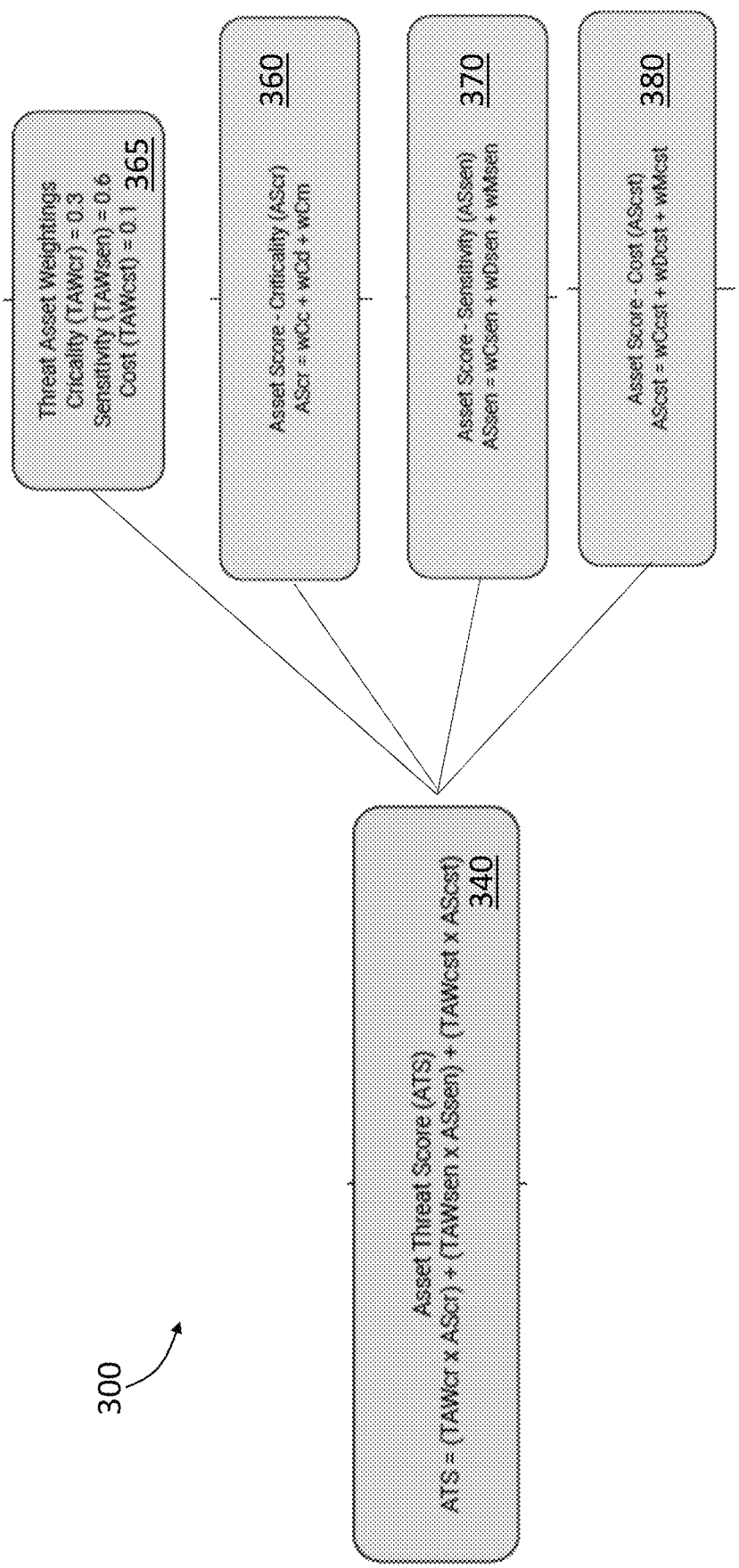

FIG. 3C shows that the calculation of the ATS 340 includes a weighted sum of three scores, including an asset criticality score (AScr) 360, an asset sensitivity score (ASsen) 370, and an asset cost score (AScst) 380. In other words, the ATS 340 is calculated according to the formula ATS=(TAWcr×AScr)+(TAWsen×ASsen)+(TAWcst×AScst), where TAWcr is a first weight number for the AScr 360, TAWsen is a second weight number for the ASsen 370, and TAScst is a third weight number for the AScst 380. The three weight numbers (i.e., TAWcr, TAWsen, and TAWcst) are collectively referred to as the threat asset weightings 365. In some implementations, the first weight TAWcr is 0.3, the second weight TAWsen is 0.6, and the third weight TAWcst 0.1 in the method 300 for analysis and scoring of document markings. In some implementations, any other suitable weights can be used and such weights can be defined based on different digital risk types and/or categories.

Figure 3D:
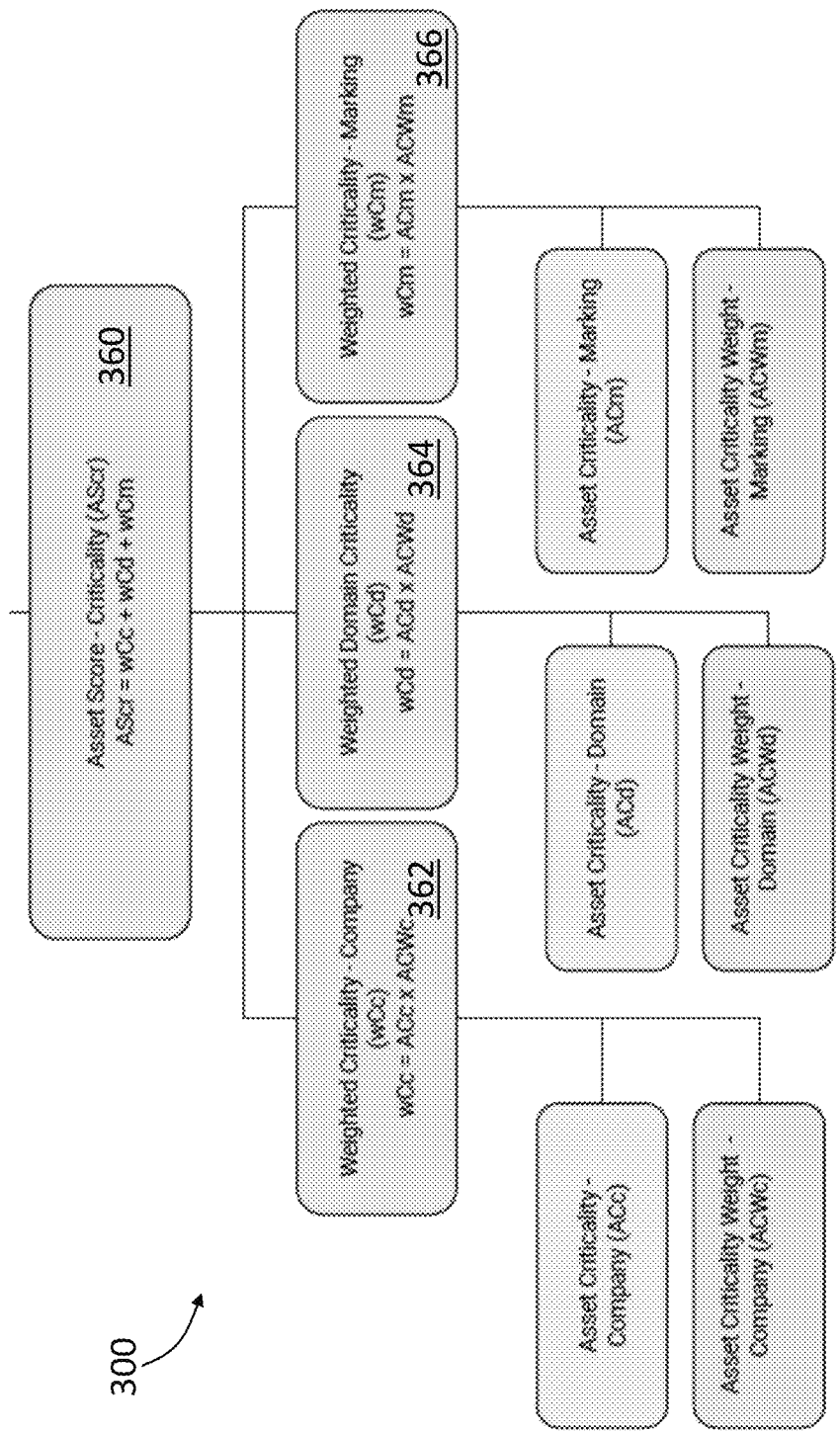
Figure 3E:
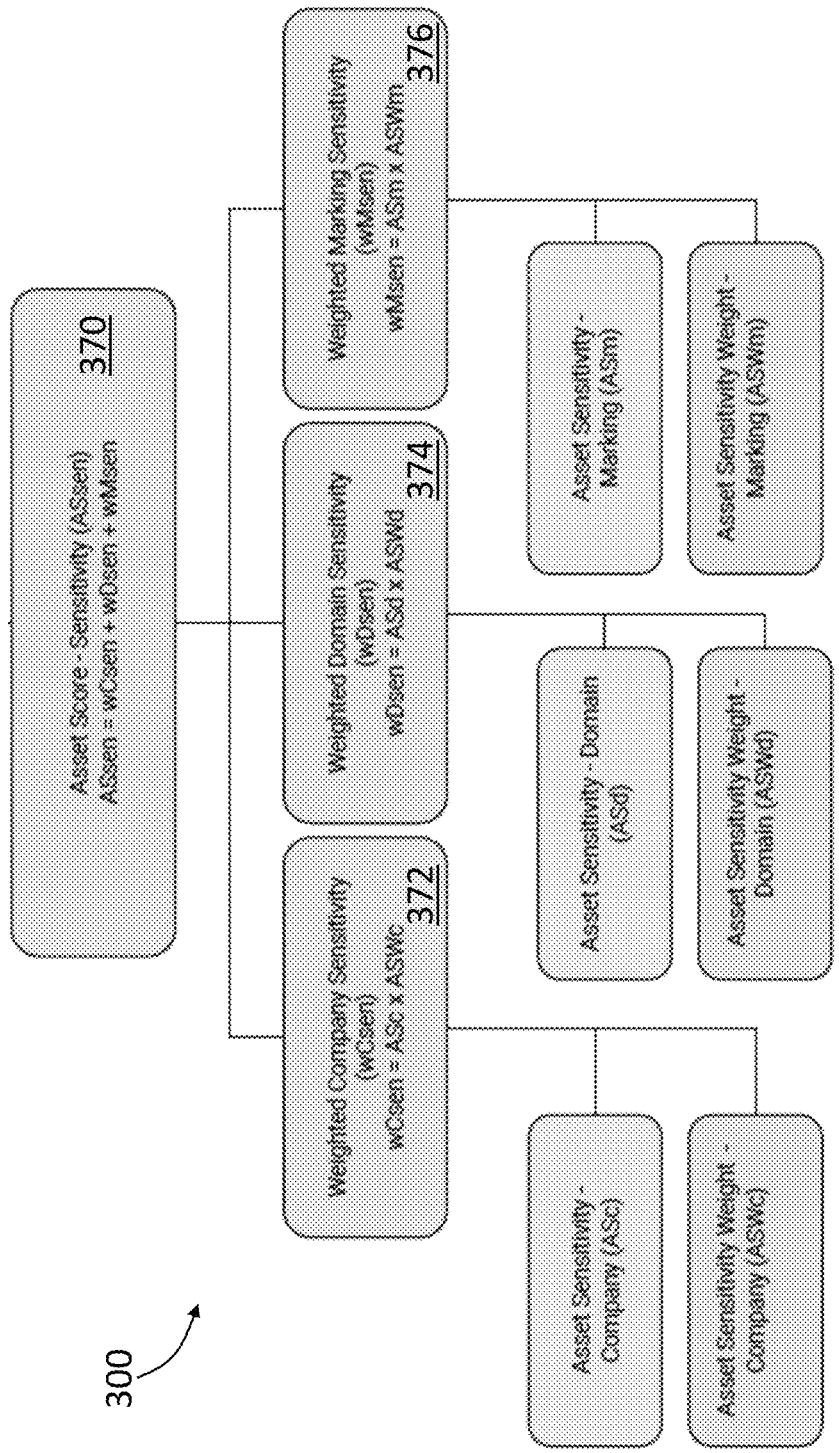
Figure 3F:
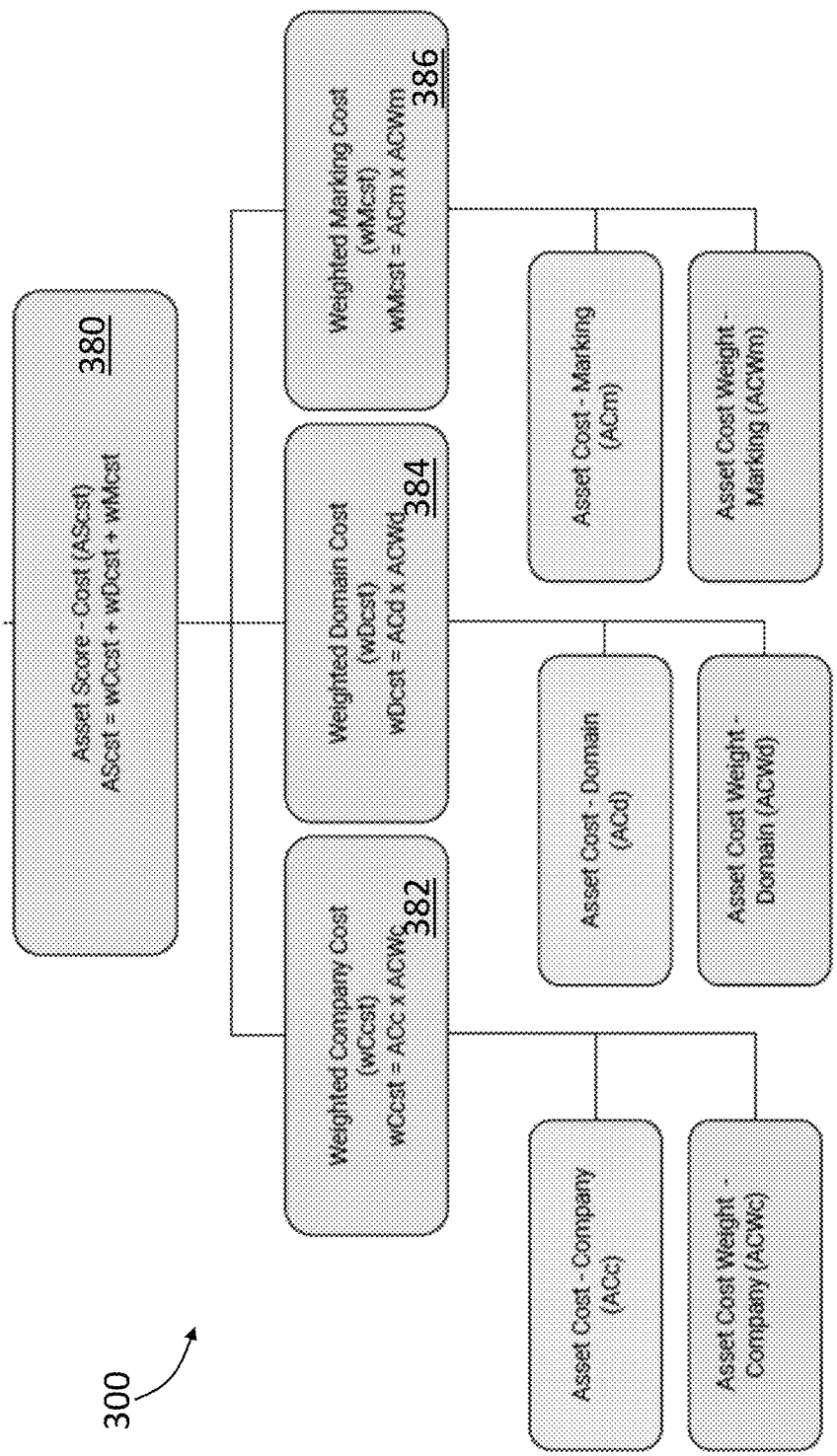

FIGS. 3D-3F shows that calculations of the AScr 360, the ASsen 370, and the AScst 380, respectively, which are used in calculating the ATS 340 as illustrated in FIG. 3C. In FIG. 3D, the AScr 360 is calculated by summing three factors, including a weighted company criticality (wCc) 362, a weighted domain criticality (wCd) 364, and a weighted marking criticality (wCm) 366, i.e., Ascr=wCc+wCd+wCm. In addition, FIG. 3D also shows that the wCc 362 is calculated by multiplying an asset criticality company score (ACc) with an asset criticality company weight. Similarly, the wCd 364 is calculated by multiplying an asset criticality domain score (ACd) with an asset criticality domain weight, and the wCm 366 is calculated by multiplying an asset criticality domain score (ACm) with an asset criticality domain weight. Any suitable weights can be used and such weights can be defined based on different digital risk types and/or categories.

FIG. 3E shows that the ASsen 370 is calculated by summing three factors, including a weighted company sensitivity (wCsen) 372, a weighted domain sensitivity (wDsen) 374, and a weighted marking sensitivity (wMsen) 376, i.e., ASsen=wCsen+wDsen+wMsen. In addition, FIG. 3E also shows that the wCsen 372 is calculated by multiplying an asset sensitivity company score (ASc) with an asset sensitivity company weight. Similarly, the wDsen 374 is calculated by multiplying an asset sensitivity domain score (ASd) with an asset sensitivity domain weight, and the wMsen 376 is calculated by multiplying an asset sensitivity marking score (ASm) with an asset sensitivity marking weight. Any suitable weights can be used and such weights can be defined based on different digital risk types and/or categories.

FIG. 3F shows that the AScst 380 is calculated by summing three factors, including a weighted company cost (wCcst) 382, a weighted domain cost (wDcst) 384, and a weighted marking cost (wMcst) 386, i.e., AScst=wCcst+wDcst+wMcst. In addition, FIG. 3F also shows that the wCcst 382 is calculated by multiplying an asset cost company score (ACc) with an asset cost company weight. Similarly, the wDcst 384 is calculated by multiplying an asset cost domain score (ACd) with an asset cost domain weight, and the wMcst 386 is calculated by multiplying an asset cost marking score (ACm) with an asset cost marking weight. Any suitable weights can be used and such weights can be defined based on different digital risk types and/or categories.

Figure 3G:
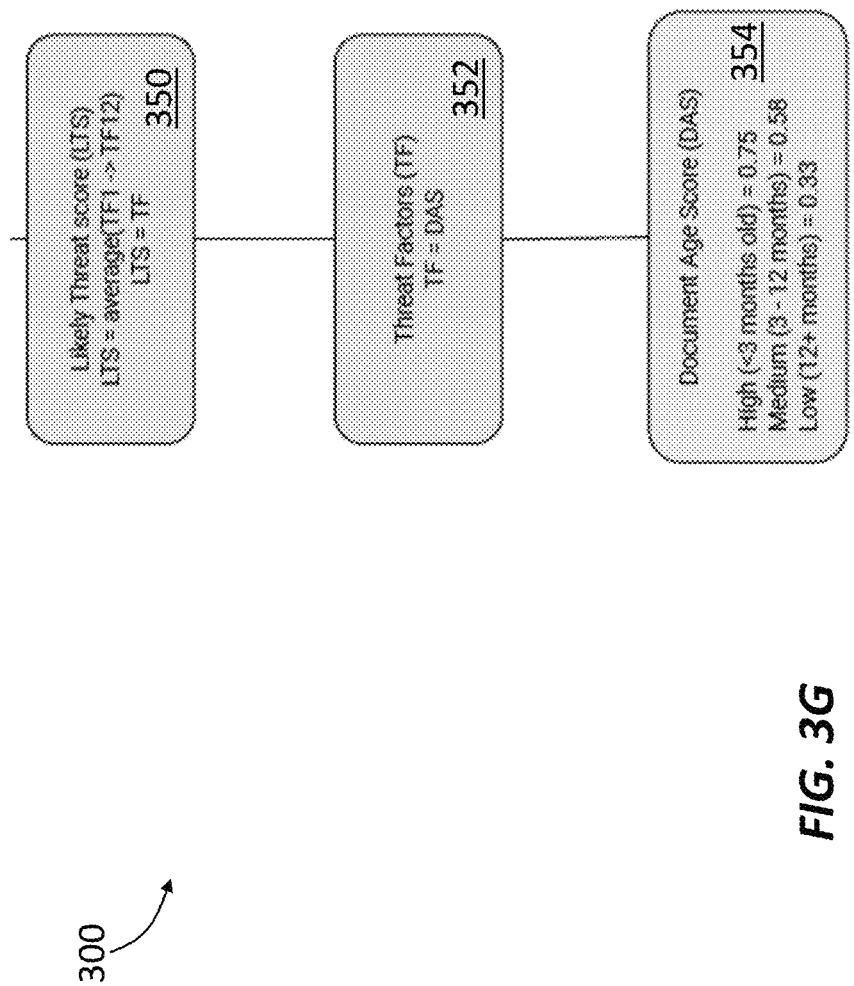

FIG. 3G shows that the calculation of the LTS 350. In the method 300, the LTS 350 is equal to a threat factor 352, which in turn is equal to a document age score (DAS) 354. More specifically, if the suspect document is less than 3 months older, the DAS 354 is 0.75. If the document is more than 3 months old but less than 12 months old, the DAS 354 is 0.58. If the document is more than 12 months old, the DAS 354 is 0.33. In some implementations, any other suitable values can be used and such weights can be defined based on different digital risk types and/or categories.

In some embodiments, the method 300 can be performed in the following order. First calculate the AScr 360, the ASsen 370, and the AScst 380, as illustrated in FIGS. 3D-3F, respectively, in order to calculate the ATS 340. Also calculate the LTS 350 according to FIG. 3G. Once the ATS 340 and the LTS 350 are calculated, they are used to calculate the risk impact score 330 according to FIG. 3B. Based on the risk impact score 330 and the risk likelihood score 320, the final risk score 310 can be calculated according to FIG. 3A.

The risk score 310 then can be used for various purposes. In some embodiments, the risk score 310 can be used to alert the business entity that might be affected by the digital risk (e.g., when the risk score 310 is about a threshold value). If the risk score 310 is less than the threshold value, the service provider can store the risk score 310 in its database and keep monitoring the same digital risk. In some embodiments, when the risk score 310 is calculated, the service provider can send the risk score 310 to the business entity regardless of the value of the risk score 310. In these embodiments, the business entity itself can also monitor the digital risk.

FIGS. 4A-4H illustrate a method 400 of analyzing and scoring digital risk related to domain impersonation, according to an embodiment. In some implementations, the method 400 can be used with the systems and methods shown and described with respect to FIGS. 7-11 to calculate and/or determine a risk score for domain impersonation.

Figure 4A:
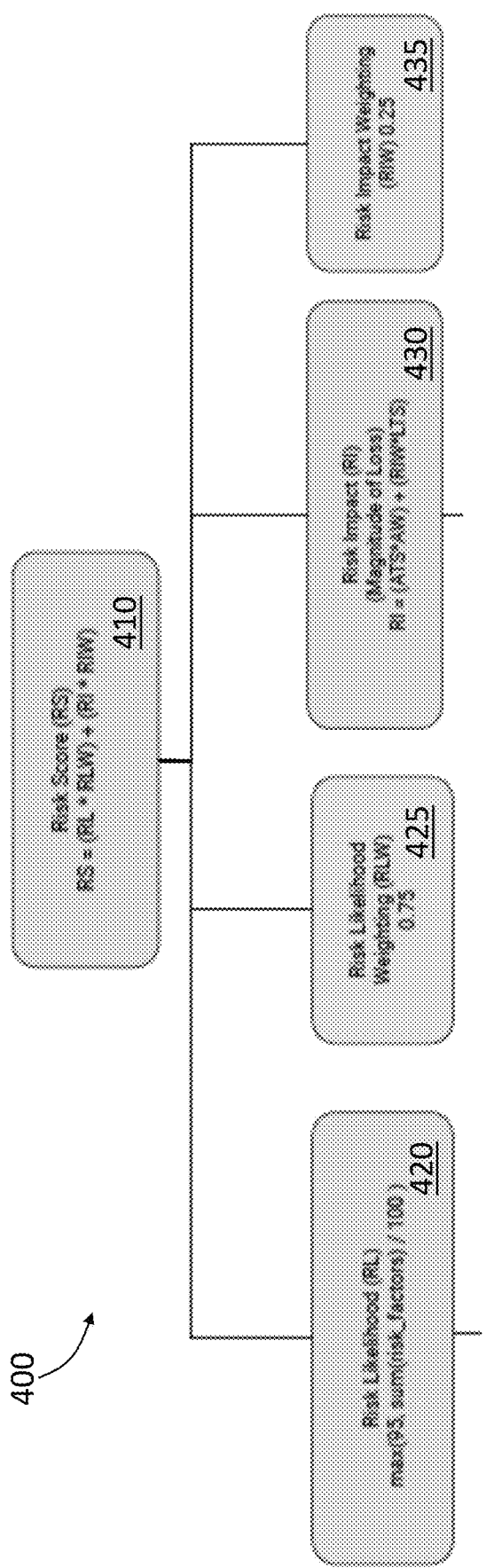
FIGS. 4A-4H illustrate a method of analyzing and scoring digital risk related to domain impersonation, according to an embodiment.

FIG. 4A shows that the risk score 410 is calculated by taking a weighted sum of a risk likelihood score 420 and a risk impact score 430, i.e., risk score=(risk likelihood score× RLW)+(risk impact score×RIW), where RLW is a risk likelihood weight 425 and RIW is a risk impact weight 435. In some implementations, the risk likelihood weight 425 is 0.75 and the risk impact weight 425 is 0.25 for domain impersonation analysis. In some implementations, any other suitable weights can be used and such weights can be defined based on different digital risk types and/or categories.

Figure 4B:
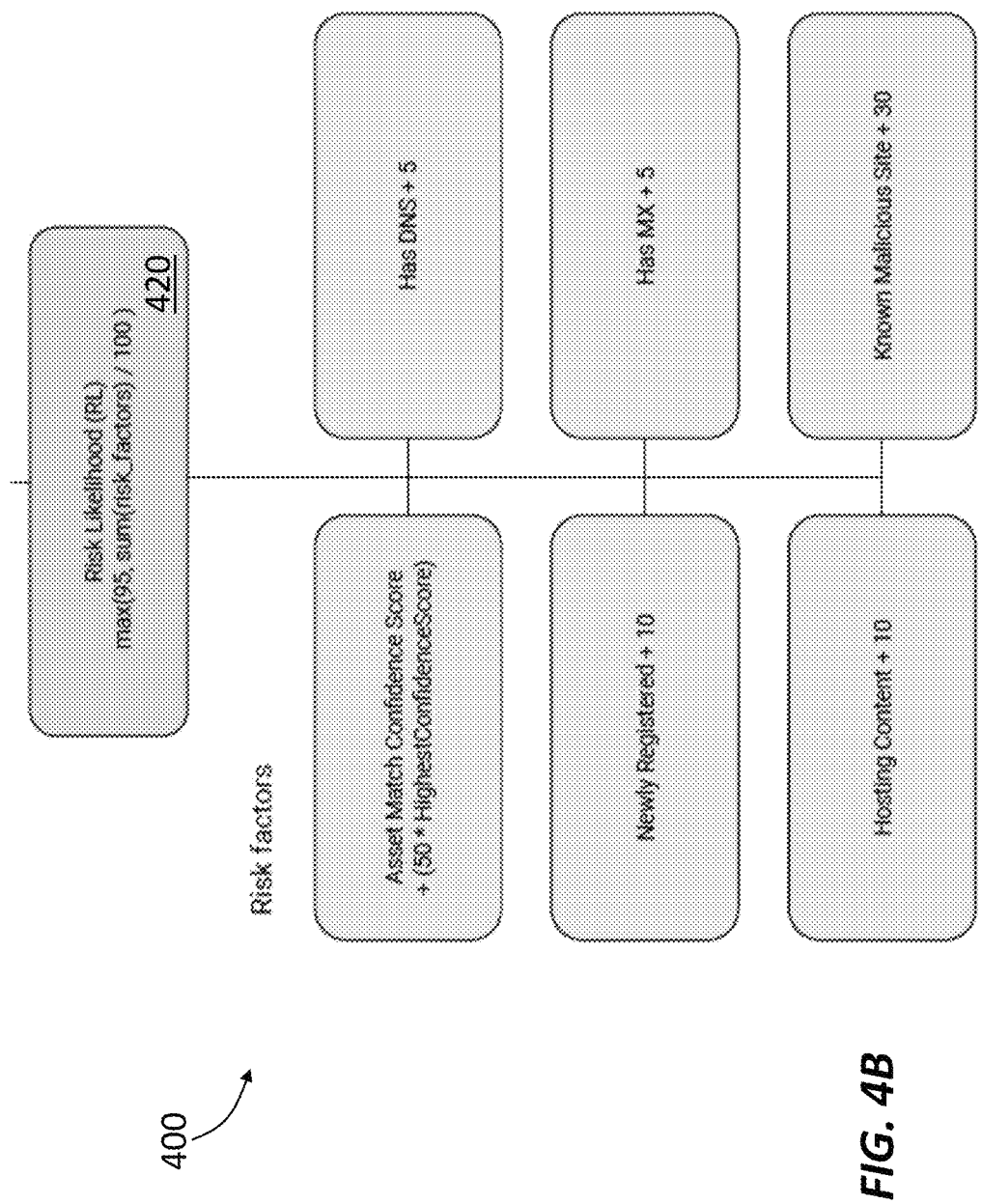

FIG. 4B shows the calculation of the risk likelihood score 420. A sum of risk factors is first performed. The risk factors include asset match confidence, which represents the confidence level that the suspect domain matches an actual asset (e.g., an online store) owned by the entity. The value of the asset match confidence is calculated by multiplying a confidence score with a factor (50), and the resulting value is added into the sum. If the suspect domain has a DNS, then 5 points are added to the sum. If the suspect domain is a newly registered domain, then 10 points are added to the sum. If the domain has a mail exchanger (MX), then 5 points are added to the sum. If the suspect domain hosts content, then 10 points are added to the sum. If the suspect domain is a known malicious site, then 30 points are added to the sum. In some implementations, any other factors or point values can be used and such weights can be defined based on different digital risk types and/or categories.

Once the factors are examined and the sum of the risk factors is obtained, the greater value between the sum and 95 is selected, i.e., min (95, sum(risk factors)). The selected value is then divided by 100, i.e., risk likelihood score=min (95, sum (risk factors))/100. In some implementations, any other suitable factors, weights and/or score can be used to calculate the risk likelihood score.

Figure 4C:
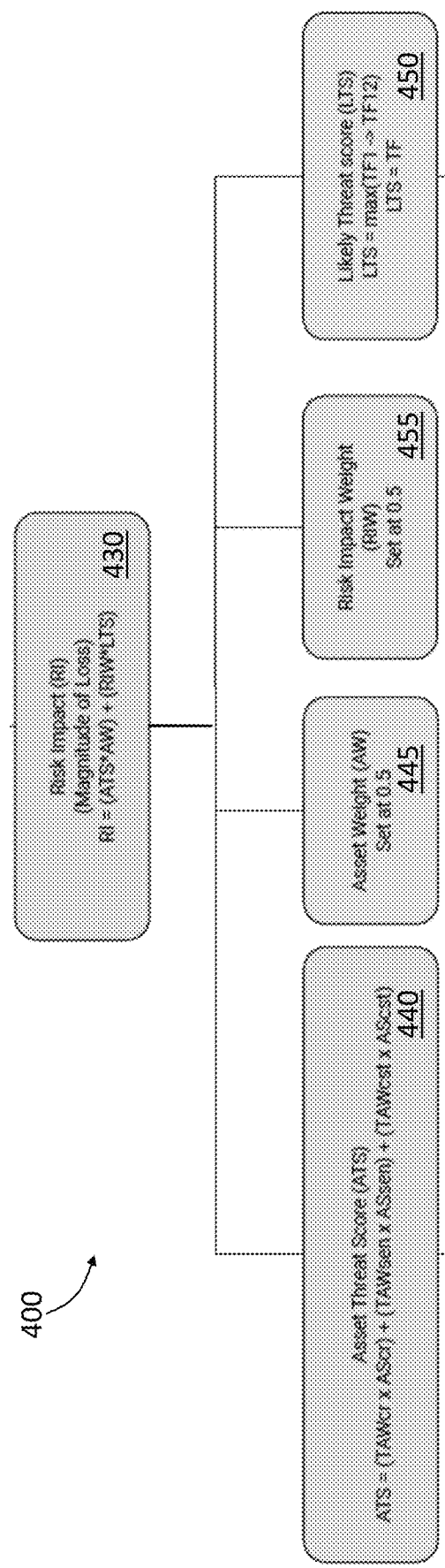

FIG. 4C shows that the risk impact score 430 is calculated by a weighted sum of an asset threat score (ATS) 440 and a likely threat score (LTS) 450, i.e., risk impact score=(ATS× AW)+(RIW×LTS), where AW is an asset weight 445 and RIW is a risk impact weight 455. In some implementations, the asset weight 345 and the risk impact weight 355 are both 0.5 for analysis of domain impersonation. In some implementations, any other suitable weights can be used and such weights can be defined based on different digital risk types and/or categories.

Figure 4D:
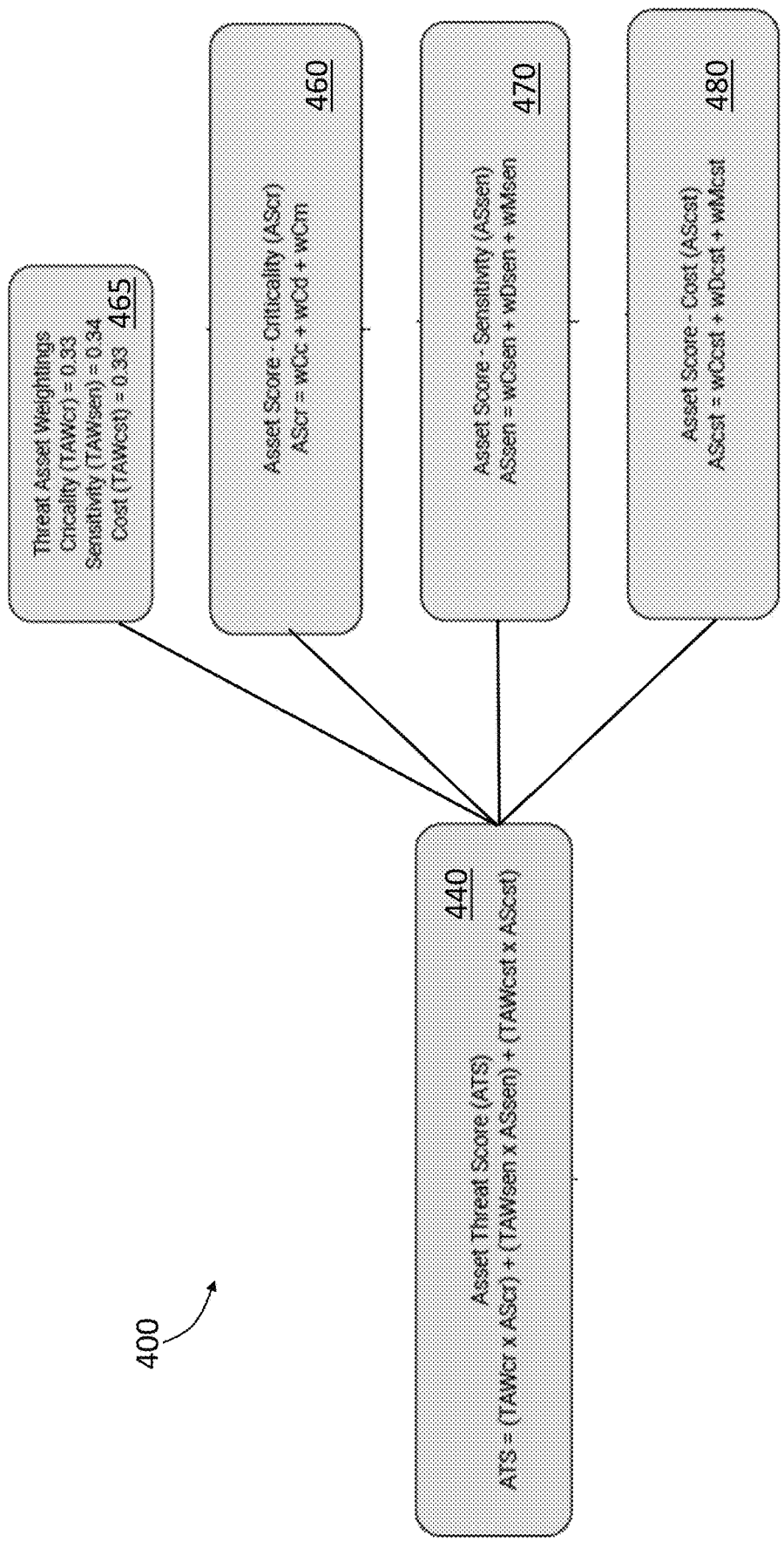

FIG. 4D shows that the calculation of the ATS 440 includes a weighted sum of three scores, including an asset criticality score (AScr) 460, an asset sensitivity score (ASsen) 470, and an asset cost score (AScst) 480. In other words, the ATS 440 is calculated according to the formula ATS=(TAWcr×AScr)+(TAWsen×ASsen)+(TAWcst×AScst), where TAWcr is a first weight for the AScr 460, TAWsen is a second weight for the ASsen 470, and TAScst is a third weight for the AScst 480. The three weights (i.e., TAWcr, TAWsen, and TAWcst) are collectively referred to as the threat asset weightings 465. In some implementations, the first weight TAWcr is 0.33, the second weight TAWsen is 0.34, and the third weight TAWcst 0.33 in the method 400 for analysis and scoring of domain impersonation. In some implementations, any other suitable weights can be used and such weights can be defined based on different digital risk types and/or categories.

Figure 4E:
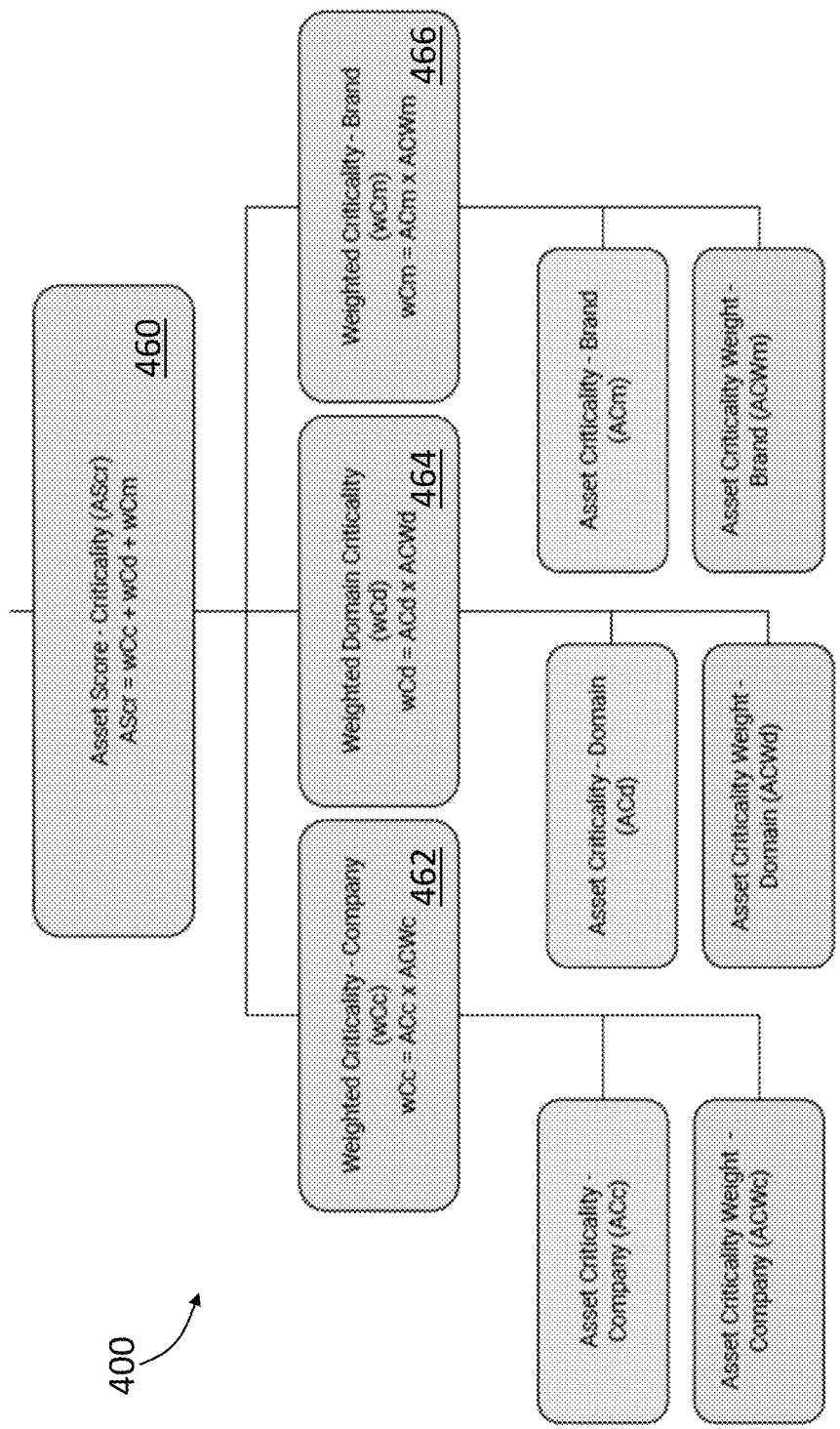
Figure 4F:
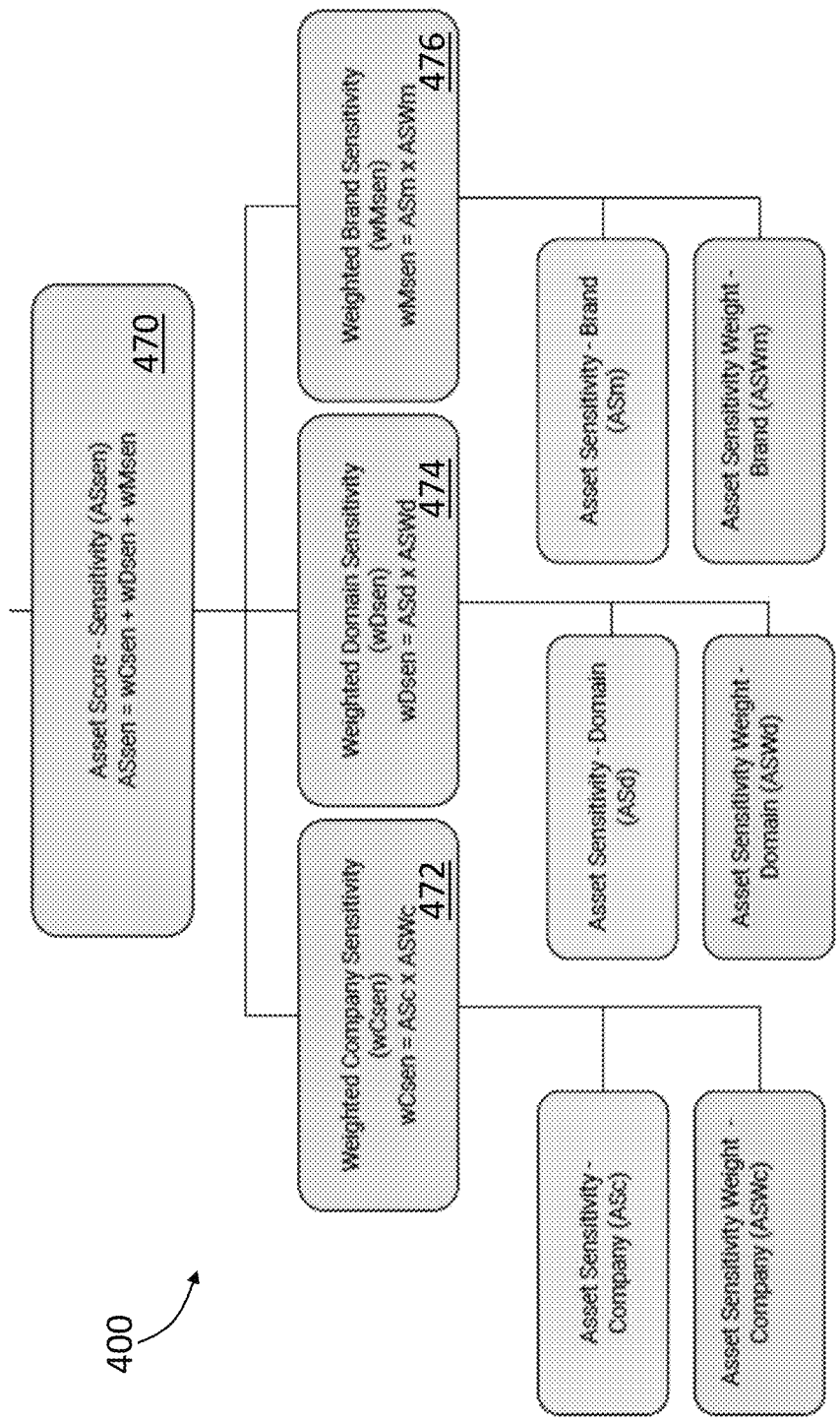
Figure 4G:
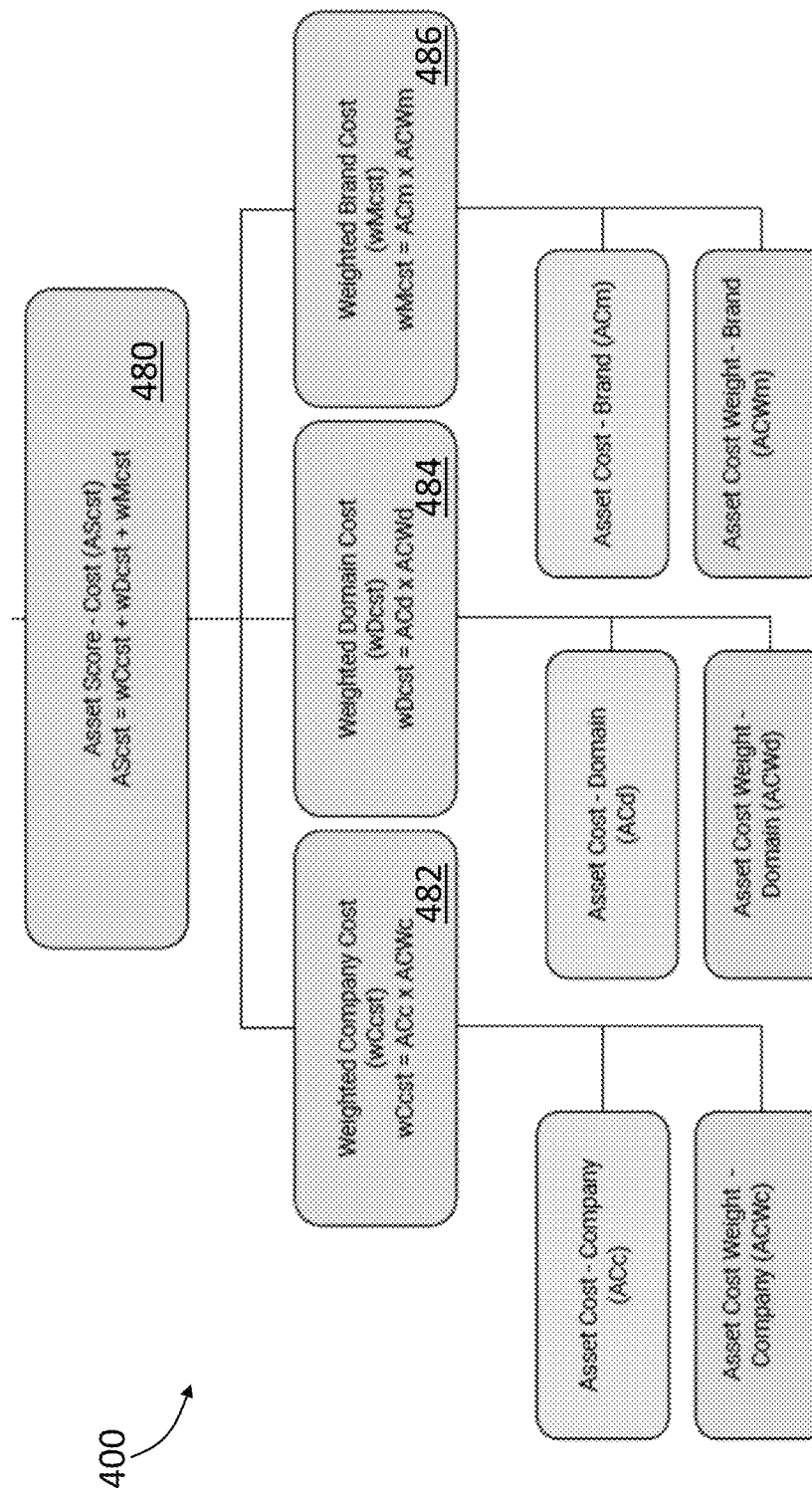

FIGS. 4E-4G show that calculations of the AScr 460, the ASsen 470, and the AScst 480, respectively, which are used in calculating the ATS 440 as illustrated in FIG. 4D. FIG. 4E shows that the AScr 460 is calculated by summing three factors, including a weighted company criticality (wCc) 462, a weighted domain criticality (wCd) 464, and a weighted brand criticality (wCm) 466, i.e., Ascr=wCc+wCd+wCm. In addition, FIG. 4E also shows that the wCc 462 is calculated by multiplying an asset criticality company score (ACc) with an asset criticality company weight. Similarly, the wCd 464 is calculated by multiplying an asset criticality domain score (ACd) with an asset criticality domain weight, and the wCm 466 is calculated by multiplying an asset criticality brand score (ACm) with an asset criticality brand weight. In some implementations, the weights can have any suitable values and such weights can be defined based on different digital risk types and/or categories.

FIG. 4F shows that the ASsen 470 is calculated by summing three factors, including a weighted company sensitivity (wCsen) 472, a weighted domain sensitivity (wDsen) 474, and a weighted brand sensitivity (wMsen) 476, i.e., ASsen=wCsen+wDsen+wMsen. In addition, FIG. 4F also shows that the wCsen 372 is calculated by multiplying an asset sensitivity company score (ASc) with an asset sensitivity company weight. Similarly, the wDsen 474 is calculated by multiplying an asset sensitivity domain score (ASd) with an asset sensitivity domain weight, and the wMsen 476 is calculated by multiplying an asset sensitivity brand score (ASm) with an asset sensitivity brand weight. In some implementations, the weights can have any suitable values and such weights can be defined based on different digital risk types and/or categories.

FIG. 4G shows that the AScst 480 is calculated by summing three factors, including a weighted company cost (wCcst) 482, a weighted domain cost (wDcst) 484, and a weighted brand cost (wMcst) 486, i.e., AScst=wCcst+wDcst+wMcst. In addition, FIG. 4G also shows that the wCcst 482 is calculated by multiplying an asset cost company score (ACc) with an asset cost company weight. Similarly, the wDcst 484 is calculated by multiplying an asset cost domain score (ACd) with an asset cost domain weight, and the wMcst 386 is calculated by multiplying an asset cost brand score (ACm) with an asset cost brand weight. In some implementations, the weights can have any suitable values and such weights can be defined based on different digital risk types and/or categories.

Figure 4H:
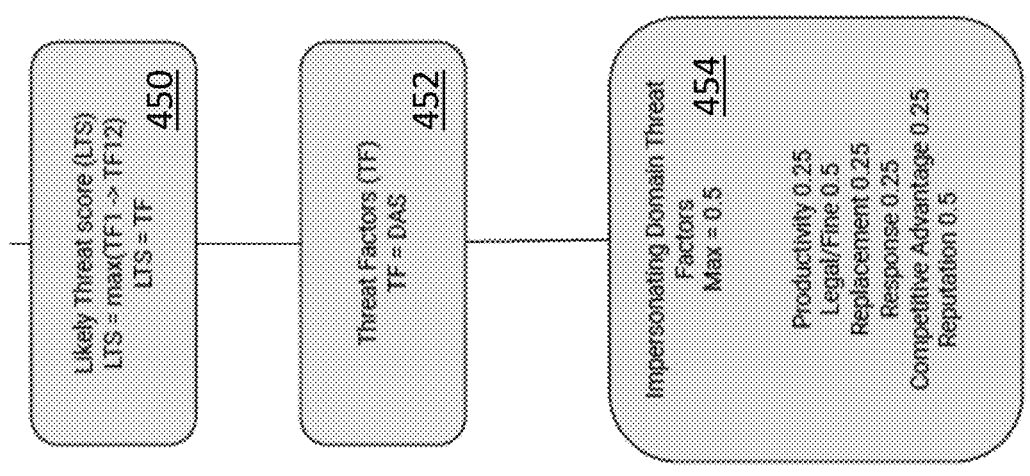

FIG. 4H shows the calculation of the LTS 450. In the method 400, the LTS 450 is equal to a threat factor 452, which depends on several impersonating domain threat factors 454. In some implementations, the maximum value of the impersonating domain threat factors 454 is set at 0.5. Some examples of the impersonating domain threat factors 454 include threat to productivity (e.g., value set at 0.25), threat to legal penalty (e.g., fines, value set at 0.5), threat to replacement (e.g., replacement of hardware/software affected by impersonation, value set at 0.25), threat to response (e.g., value set at 0.25), threat to competitive advantages (e.g., value set at 0.25), and threat to reputation of the entity (e.g., value set at 0.5). In some implementations, the maximum value of the impersonating domain threat factors and/or the values of the impersonating domain threat factors can be any suitable values.

Figure 5:
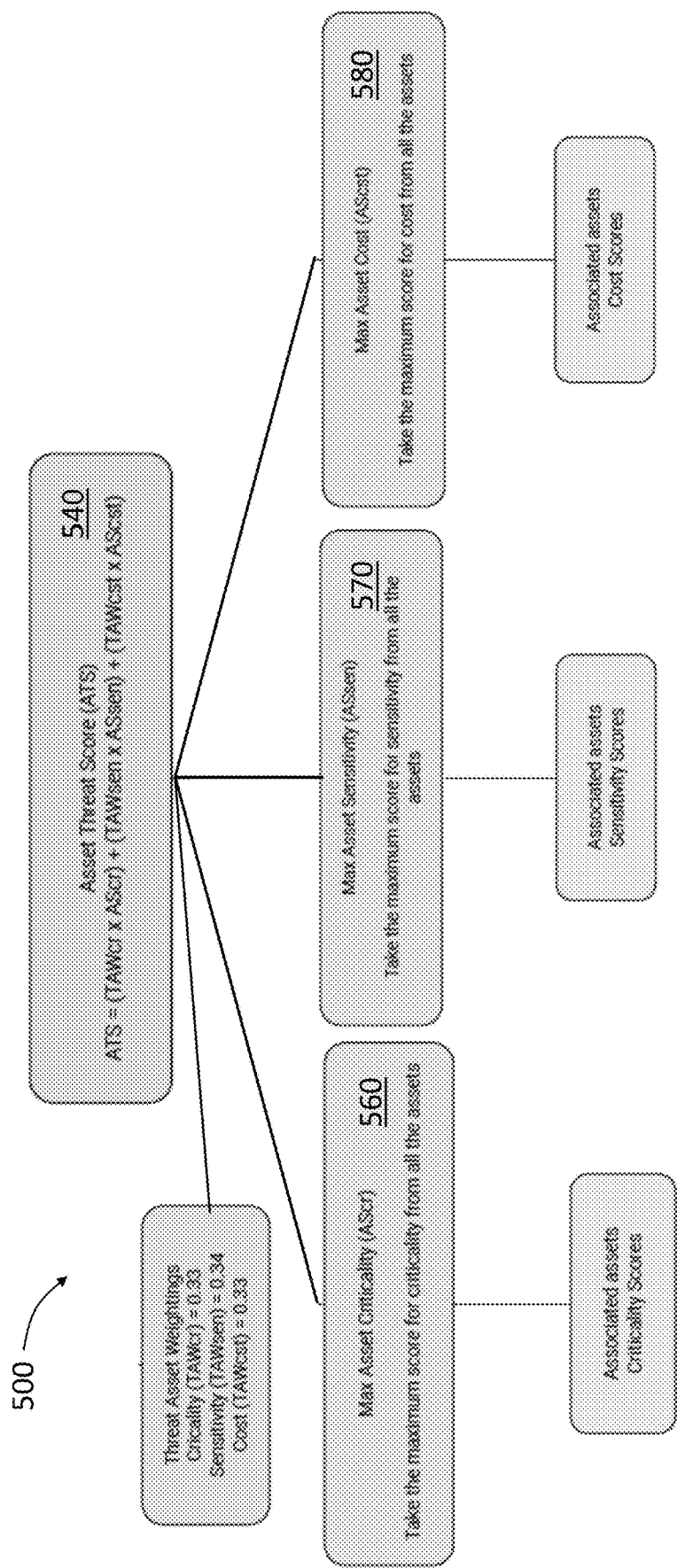
FIG. 5 illustrates a method of calculating an asset threat score that can be used for analyzing and scoring digital risks, according to an embodiment.

FIG. 5 illustrates a method 500 of calculating an asset threat score (ATS) 540 that can be used for analyzing and scoring digital risks, according to an embodiment. The ATS 540 can play similar roles as ATS 440 and 340 in calculating the final risk scores, but the ATS 540 from the method 500 is calculated as follows: ATS=(TAWcr×AScr)+(TAWsen× ASsen)+(TAWcst×AScst), where TAWcr is a first weight for max asset criticality (AScr) 560, TAWsen is a second weight for max asset sensitivity (ASsen) 570, and TAScst is a third weight for max asset cost (AScst) 580. The AScr 560 represents the maximum asset criticality score among the assets of the entity that might be affected by the digital risk. The ASsen 570 represents the maximum asset sensitivity score among the assets of the entity that might be affected by the digital risk. The AScst 580 represents the maximum asset cost scores among the assets of the entity that might be affected by the digital risk. In some instances, the weights can be set as follows: the TAWcr is set at 0.33, the TAWsen is set at 0.34, and TAWcst is set at 0.33. In some instances, any other suitable weights can be used and such weights can be defined based on different digital risk types and/or categories.

While examples of digital risk scoring are shown and described above as calculating risk scores for specific risk types, such methods (e.g., methods, 300. 400, and 500) can be used to calculate scores of any other risk types. For example, such methods can be used to calculate scores for online brand security, reduction of attack surfaces, and data loss detection as described above.

Figure 6:
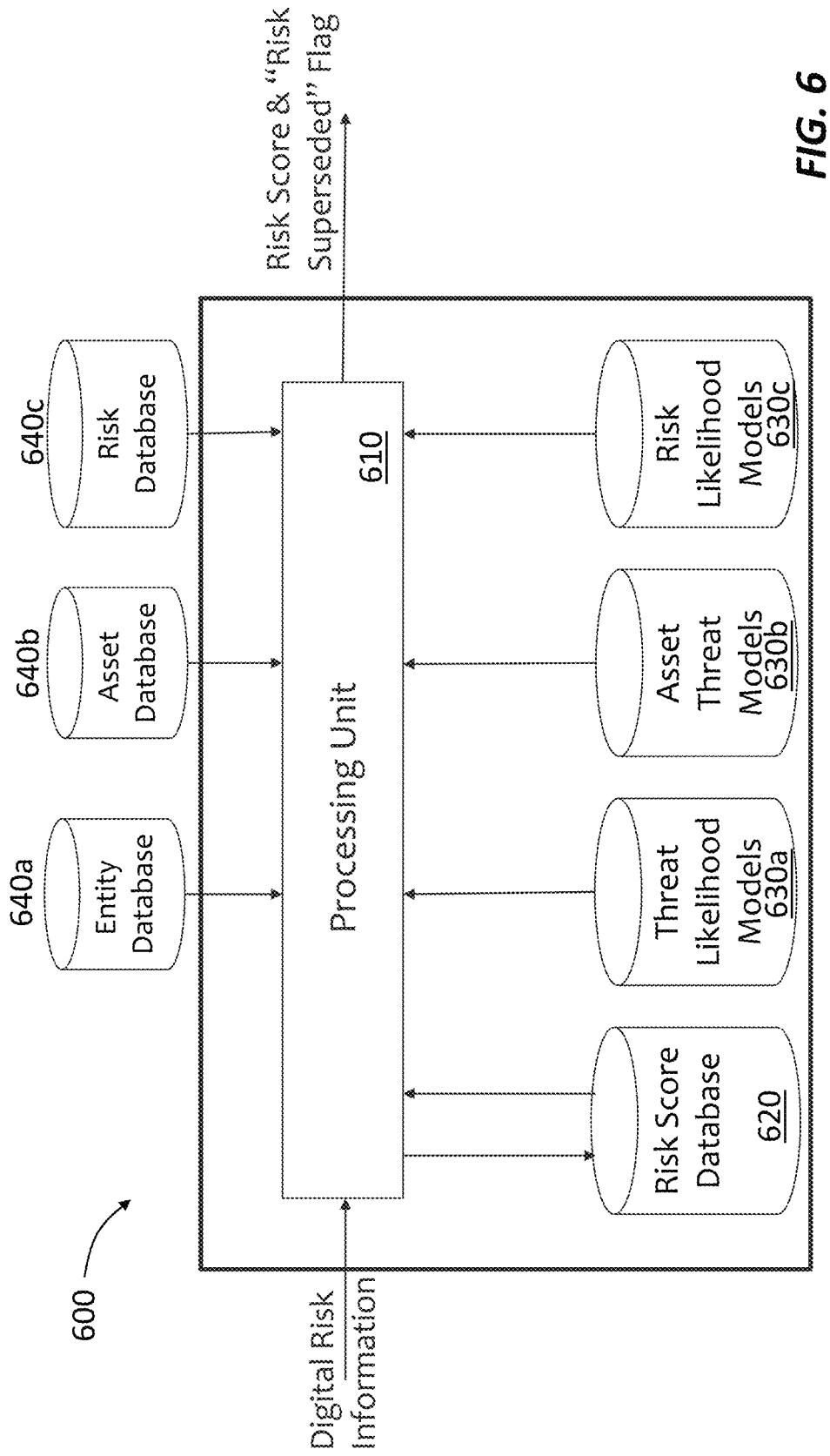
FIG. 6 is a schematic illustration of a system for analyzing and scoring digital risks, according to an embodiment.

FIG. 6 is a schematic illustration of a system 600 for analyzing and scoring digital risks, according to an embodiment. The system 600 includes a processing unit 610 operatively coupled to a first set of databases 630a to 630c. The database 630a is configured to store threat likelihood models, the database 630b is configured to store asset threat models 630b, and the database 630c is configured to store risk likelihood models.

The threat likelihood models in the database 630a are used to calculate the likely threat score (LTS) (e.g., LTS used in the method 200, LTS 350 in the method 300, and/or LTS 450 in the method 400). For example, the threat likelihood model can include information about the document age score 354 shown in FIG. 3G and/or the risk factors shown in FIG. 4H. The processing unit 610, when calculating the LTS, can retrieve the weight numbers and/or scores associated with the threat likelihood models.

The asset threat models stored in the database 630b are used to calculate the asset threat score (ATS) (e.g., the ATS used in the method 200, the ATS 340 in the method 300, and/or the ATS 440 in the method 400). The asset threat models can include information about weight numbers used in the calculation (e.g., RIW 455, weight numbers 465, etc.). The risk likelihood models stored in the database 630c are used to calculate the risk likelihood score (e.g., the risk likelihood score used in the method 200, 320 in the method 300, and/or 420 in the method 400). For example, the risk likelihood models can include the preset values of various risk factors as illustrated in FIG. 4B.

The processing unit 610 is also operatively coupled to a second set of databases, including database 640a configured to store entity information, database 640b configured to store asset information, and database 640c to store risk information. The entity information can include attributes of each subscribing entity (e.g., client of a service provider who performs analysis and scoring of digital risk). The asset information can include information about assets owned by each client (e.g., values of asset). The risk information includes types of digital risks that can be analyzed and scored by the system 600. In addition, the risk information can also help the processing unit 610 locate the specific model used for analysis and scoring (e.g., which threat likelihood model to use among those stored in the database 630a).

The system 600 also includes a risk score database 620 configured to store risk scores calculated by the system 600.

For example, for the same type of risks related to a given entity, the risk score database 620 can be configured to store historical scores that were calculated by the processing unit 610. In some implementations, each time a new risk score is calculated for the same risk toward the same entity, the new risk score can be compared with historical scores to determine potential changes of the risk.

Although multiple databases (e.g., 620, 630*a* to 630*c*, and 640*a* to 640*c*) are illustrated in FIG. 6, these databases may be consolidated into a single database and stored in one (or more) memory. In some embodiments, the memory can be a random access memory (RAM), a memory buffer, a hard drive, a read-only memory (ROM), an erasable programmable read-only memory (EPROM), and/or the like. The databases can be any suitable database such as, for example, a relational database, an object database, an object-relational database, a hierarchical database, a network database, an entity-relationship database, a structured query language (SQL) database, an extensible markup language (XML) database, digital repository, a media library, a cloud server or storage, and/or the like.

In some embodiments, the processing unit 610 and the databases are disposed at the same location, and the system 600 can form a server. In some embodiments, the processing unit 610 can be remote from one or more of the databases and communicate with the database via a network (not shown in FIG. 6). The network can be any type of network such as, for example, a local area network (LAN), a virtual network such as a virtual local area network (VLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network can be implemented as a wireless local area network (WLAN) based on the Institute of Electrical and Electronics Engineers (IEEE) 802.11 standards (also known as "WiFi®"). Moreover, the network can include a combination of networks of any type such as, for example, a LAN or WLAN and the Internet.

The processing unit 610 can be any suitable processing device configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

In some embodiments, the processing unit 610 can be configured as a server or group of servers, a network management device, a personal computer (PC), a processing unit, and/or the like. In some embodiments, the processing unit 610 can be configured as a portable device and communicate with the databases via any suitable network described above. Examples of portable devices include a personal computer (PC), a laptop, a convertible laptop, a tablet, a personal digital assistant (PDA), a smartphone, a wearable electronic device (e.g., a smart watch, etc.), and/or the like.

In some embodiments, the system 600 further includes a communication interface to receive information related to the digital risk and/or deliver the calculated risk score. The communication interface can be any suitable module and/or device that can place the system 600 in communication with external sources, such as one or more network interface cards or the like. Such a network interface card can include, for example, an Ethernet port, a WiFi® radio, a Bluetooth® radio (e.g., a Bluetooth® antenna), a near field communication (NFC) radio, and/or a cellular radio. As such, the communication interface can send signals to and/or receive signals from the processing unit 610. In some instances, the communication interface of the system 600 include multiple communication interfaces (e.g., a WiFi® communication interface to communicate with the one external source and a Bluetooth® communication interface to communicate with another external source).

In operation, the system 600 receives information related to a digital risk via, e.g., a communication interface. The processing unit 610 is then configured to calculate the risk score by retrieving data stored in the databases (e.g., 630*a* to 630*c* and 640*a* to 640*c*). For example, the processing unit 610 can be configured to perform the method 200 illustrated in FIG. 2, the method 300 illustrated in FIGS. 3A-3G, the method 400 illustrated in FIG. 4A-4H, and/or the method 500 illustrated in FIG. 5. The calculated risk score can be sent to an operator of the system 600 via, e.g., a communication interface. The calculated risk score can also be sent to entities that might be affected by the digital risk. Entities then can take preventive and/or remedial measures accordingly. In some embodiments, the risk score can be sent to a computing device operated by the affected entity and the computing device can automatically initiate the preventive/remedial measures.

Figure 7:
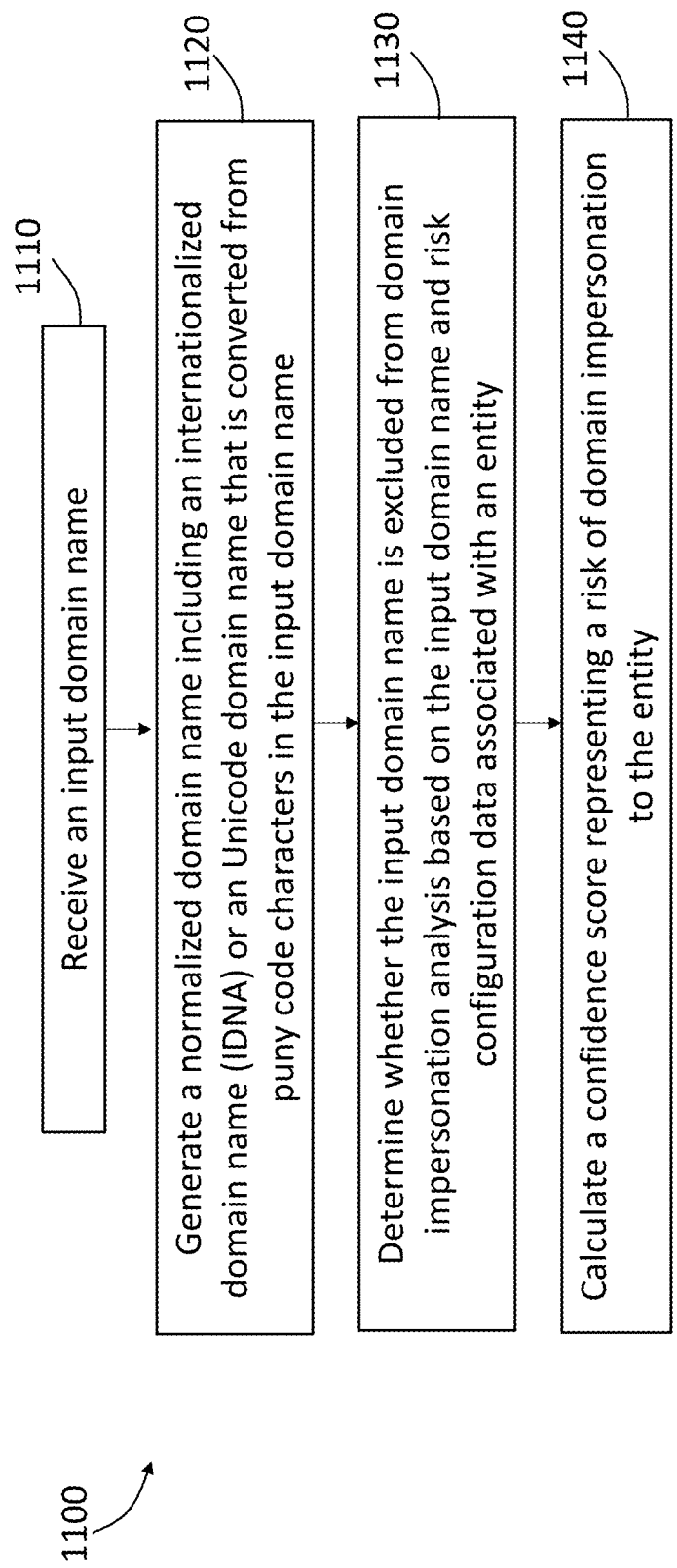
FIG. 7 is a flowchart illustrating a method of calculating confidence of domain name impersonation, according to an embodiment.

FIG. 7 is a flowchart illustrating a method 1100 for calculating confidence of domain name impersonation, according to an embodiment. In some implementations, the method 1100 can be used with other systems and/or methods described herein to calculate a risk of domain name impersonation. The method 1100 includes, at 1110, receiving an input domain name. In some embodiments, the input domain name is received and analyzed by a processor (see, e.g., FIG. 11 and descriptions below). Similarly stated, in some embodiments, a processor can execute the method 1100. In some instances, for example, the processor can search Domain Name System (DNS) servers, domain name registers, websites, and/or the like to identify domain names. In other instances, the processor can receive domain names in any other suitable manner from any other suitable source (e.g., a database).

The method 1100 also includes, at 1120, generating a normalized domain name based on the input domain name. The normalized document includes at least one of an internationalized domain name (IDNA) or a Unicode domain name for further processing. In some implementations, the IDNA or the Unicode domain name can be generated from puny code characters in the input domain name.

At 1130, risk configuration data associated with an entity is retrieved to determine whether the input domain name is excluded from domain impersonation analysis. In some implementations, the risk configuration data associated with each entity that might be affected by the risk of domain name impersonation is retrieved. In some implementations, the risk configuration data is provided by the entity to a service provider (e.g., a processor controlled by the service provider) that implements the method 1100.

In some implementations, the risk configuration data includes a list of assets that are excluded from domain impersonation analysis such that the processor can automatically compare the input domain name with the list to determine whether to proceed with further analysis of the input domain name. In some embodiments, the risk configuration data includes instructions that certain asset is not considered for potential impersonation. As used herein, an asset of an entity can include any property (tangible or intangible) owned by or associated with the entity. For example, the asset can include the entity name (e.g., company name), brands of products manufactured, distributed, or sold by the entity, brands of services provided by the entity, domain names owned by or associated with the entity, or any other sign, symbol, design, or expression that can cause a person to relate it to the entity (e.g., a trademark).

In the event that the input domain name is not excluded from domain impersonation analysis (i.e., the input domain name is sent for further analysis), a confidence score is calculated at 1140 to represent a risk of domain impersonation posed by the input domain name to the entity (i.e., the entity associated with the risk configuration data). The calculation of the confidence score includes analysis of a typo-squat in the input domain name and/or analysis of a combo-squat in the input domain name, as described in further detail herein.

As used herein, a typo-squat includes an alteration to an asset name (i.e., the name of an asset described herein), such as character replacement or removal, addition, and transposition. In some instances, a typo-squat can also include homoglyph replacements and top-level domain (TLD) swapping. A combo-squat refers to the situation where a suspect domain name includes an asset name of the entity alongside one or more risk identifiers. A risk identifier can include common keywords, sector specific terms, and/or matches to other assets (e.g., combinations of a brand name and a company name). In some instances, domain name impersonation can include both typo-squat and combo-squat.

In some embodiments, calculating the confidence score at 1140 includes calculating a first confidence score related to detection and analysis of typo-squatting in the input domain name. In some embodiments, calculating the confidence score at 1140 includes calculating a second confidence score related to detection and analysis of combo-squatting in the input domain name.

The confidence score calculated at 1140 represents the risk of domain impersonation posed by the input domain name to the entity. In some instances, a higher confidence score represents a higher risk of domain name impersonation. In some implementations, the risk of domain name impersonation is based on a similarity between the input domain name and a brand name associated with the entity. In some implementations, the risk of domain name impersonation is based on a similarity between the input domain name and a company name associated with the entity. In some implementations, the risk of domain name impersonation is based on a similarity between the input domain name and a domain name associated with the entity. In some implementations, the risk of domain name impersonation can be based on a similarity between the input domain name and any other asset name associated with the entity. In these implementations, the similarity can pose risks by causing confusion to parties that conduct business with the entity (e.g., clients, customers, suppliers, and regulators, etc.).

In some implementations, analyzing typo-squat in the input domain name (as part of 1140) can be achieved by edit distance 1 matching and/or homoglyph matching. In edit distance 1 matching, multiple candidate domain names are generated based on the input domain name, and each candidate domain name has an edit distance equal to or less than one from the input domain name. Without being bound by any particular theory or mode of operation, an edit distance is one if the change between two strings includes one of the following: adding a character, deleting a character, or changing a character. After the candidate domain names are generated, each candidate domain name is compared with each asset name associated with the entity (e.g., brand name, company name, and domain name, etc.). In the event that a match is detected between a candidate domain name and an asset name, a confidence score is then calculated based on the matching (see more details, e.g., in FIG. 8 and description below).

In homoglyph matching, multiple candidate domain names are generated based on the input domain name and a homoglyph map. For example, a candidate domain name can be generated by replacing one or more characters in the input domain name with a corresponding character in the homoglyph map. In some implementations, the homoglyph map is stored in a database operatively coupled to the processor that performs the method 1100. Upon receiving the input domain name, the processor can then retrieve the homoglyph map and perform the homoglyph matching.

After the candidate domain names are generated, each candidate domain name is compared with each asset name associated with the entity (e.g., brand name, company name, and domain name, etc.). In the event that a match is detected between a candidate domain name and an asset name, a confidence score is then calculated based on the matching (see more details, e.g., in FIG. 8 and description below).

In some embodiments, the generation of the candidate domain names based on the homoglyph map can be subject to certain conditions. In some instances, each candidate domain name can be generated with at most 2 homoglyph mappings applied simultaneously. In some instances, more than three consecutive map keys are considered as three map keys. As used herein, a homoglyph map can include a one-to-many mapping of characters to homoglyph replacements. For example, the term "m" can be mapped to both 'nn' and 'rn'. In this instance, "m" is also referred to as a "key." In view of the above condition, a candidate domain name such as "yummmmmmmmmm.com" is be treated as "yummm.com". In some implementations, when generating combinations of replacements, a map key includes a limit of six occurrences. For example, if the candidate domain name is "mmm1mmm2mmm3," tis input domain name is excluded from analysis. In some instances, a combination of the above conditions can also be used.

In some implementations, analyzing combo-squatting includes identifying an asset name and a combo term in the input domain name. An asset score is then calculated based on characteristics of the asset name (e.g., length of the asset name), and a combo score is calculated based on characteristics of the combo term (e.g., length of the combo term, distance from top-level domain (TLD)). The confidence score related to combo-squatting is then calculated based on the asset score and the combo score (e.g., a weighted average of the asset score and the combo score). More details of combo-squatting analysis can be found with reference to FIGS. 9-10 and descriptions below.

In some embodiments, the confidence score calculated at 1140 is sent to the entity that might be affected by the domain name impersonation. In some embodiments, the risk configuration data of the entity also includes a confidence criterion (e.g., a threshold confidence score), and the calculated confidence score at 1140 is sent to the entity if the calculated confidence score meets the confidence criterion (e.g., the calculated confidence score is equal to or greater than the threshold confidence score). In some instances, any other suitable alert is sent to the entity based on the confidence score.

In some instances, the risk configuration data includes a first confidence criterion (e.g., a first threshold confidence score) related to typo-squatting and a second confidence criterion (e.g., a second threshold confidence score) related to combo-squatting. In these instances, the method 1100 includes calculating a first confidence score (also referred to as a first calculated confidence score) based on typo-squatting analysis and a second confidence score (also referred to as a second calculated confidence score) based on combo-squatting analysis. The first calculated confidence score (or other alert) is sent to the entity if the first calculated confidence score meets the first confidence criterion (is equal to or greater than the first threshold confidence score, and the second calculated confidence score (or other alert) is sent to the entity if the second calculated confidence score is equal to or greater than the second threshold confidence score.

Figure 8:
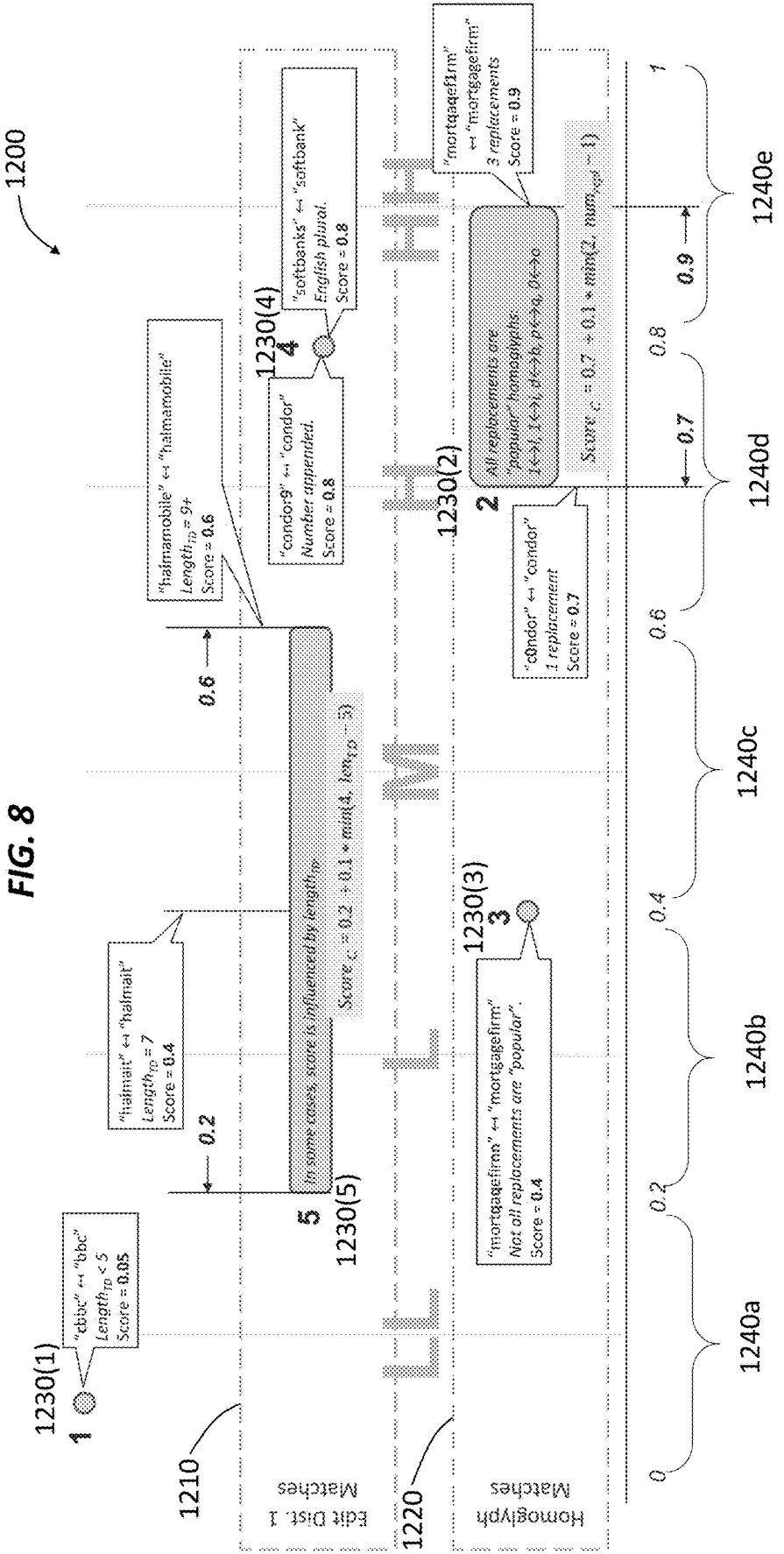
FIG. 8 is a diagram illustrating calculations of confidence scores based on detection of typo-squat, according to an embodiment.

FIG. 8 is a diagram 1200 illustrating calculations of confidence scores based on detection of typo-squat, according to an embodiment. The diagram 1200 shows that the confidence score of type-squatting is between 0 and 1. In addition, the range of the confidence score is divided into several bands, including a first band 1240*a* (LL band) representing very low confidence score (e.g., from about 0 to about 0.2), a second band 1240*b* (L band) representing low confidence score (e.g., from about 0.2 to about 0.4), a third band 1240*c* (M band) representing medium confidence score (e.g., from about 0.4 to about 0.6), a fourth band 1240*d* (H band) representing high confidence score (e.g., from about 0.6 to about 0.8), and a fifth band 1240*e* (HH band) representing very high confidence score (e.g., from about 0.8 to about 1). In some embodiments, any other number of bands can be used and/or any other suitable range can be used.

The calculated confidence score relating to typo-squatting can be disposed on the diagram 1200 such that the risk associated with the typo-squatting can be visually clear to audience (e.g., the entity that might be affected by the risk). The diagram 1200 shows five examples of confidence scores 1230(1) to 1230(5), which are calculated via edit distance 1 matching 1210 or homoglyph matching 1220. In some embodiments, this length based element of the scoring is applied regardless of whether the candidate domain was matched based on homoglyph or edit distance.

In the first example 1230(1), the target domain name is "bbc" (i.e., a domain actually associated with an entity) and the input domain name is "cbbc" that has an extra character "c" in front of the target domain name. Since the length of the target domain (i.e., Length$_{TD}$) is less than 5, a low confidence score of 0.05 is estimated.

The second example 1230(2) includes two homoglyph matchings. The first homoglyph matching has a target domain name "condor" and an input domain name "c0ndor" that replaces the character "o" in the target domain name with the number "0." The second homoglyph matching has a target domain name "mortgagefirm" and an input domain name "mortqaqef1rm" that has three replacements (i.e., two "g" replaced by two "q" and one "i" replaced by the number "1"). The replacements in this example are considered popular homoglyphs (e.g., 1↔l, 1↔i, d↔b, p↔q, 0↔o) and therefore result in a high confidence score. In addition, a larger number of replacements also leads to a higher confidence score because it tends to show intentional impersonation. As a result, the first homoglyph matching has a confidence score of 0.7 and the second homoglyph matching has a confidence score of 0.9.

As an example, the confidence score related to homoglyph matching (e.g., in the second example 1230(2)) can be calculated using the formula: confidence score=0.7+0.1*min (2, number of replacements−1). In the second example 1230(2), the first homoglyph matching has one replacement, so the confidence score is 0.7+0.1*min (2, 0)=0.7+0.1*0=0.7. The second homoglyph matching has three replacements, so the confidence score is 0.7+0.1*min (2, 2)=0.7+0.2=0.9.

In the third example 1230(3), the target domain is "mortgagefirm" and the input domain name is "mortqaqefirnn." This example includes three replacements, i.e., two "g" replaced by two "q" and one "m" replaced by "nn." The replacement between "m" and "nn" is not considered as a popular homoglyph and therefore reduces the confidence score (compared to the "mortgagefirm" domain name in the second example 1230(2)). Accordingly, the resulting confidence score is 0.4.

The fourth example 1230(4) includes two edit distance 1 matchings. The first edit distance 1 matching adds a number "9" at the end of the target domain "condor", resulting in an input domain name "condor9." The second edit distance 1 matching uses the plural form of the target domain "softbank" and results in an input domain name "softbanks." Both edit distance 1 matchings have the confidence score of 0.8 because adding a number or using a plural form are considered simple variations of the target domain name.

The fifth example 1230(5) also includes two edit distance 1 matchings. The first edit distance 1 matching has a target domain name "halmait" and an input domain name "haimait" that changes the character "l" with "i." The second edit distance 1 matching has a target domain name "halmamobile" and an input domain name "haimamobile" that also changes the character "l" with "i." In some embodiments, the confidence scores based on edit distance can be calculated via the formula: confidence score=0.2+0.1*min (4, length of target domain−5). In the first edit distance 1 matching, the length of the target domain is 7 and therefore the confidence score is 0.4. In the second edit distance 1 matching, the length of the target domain is 9 and therefore the confidence score is 0.6. In other words, a longer target domain name can lead to a higher confidence score given the same change of character.

Figure 9:
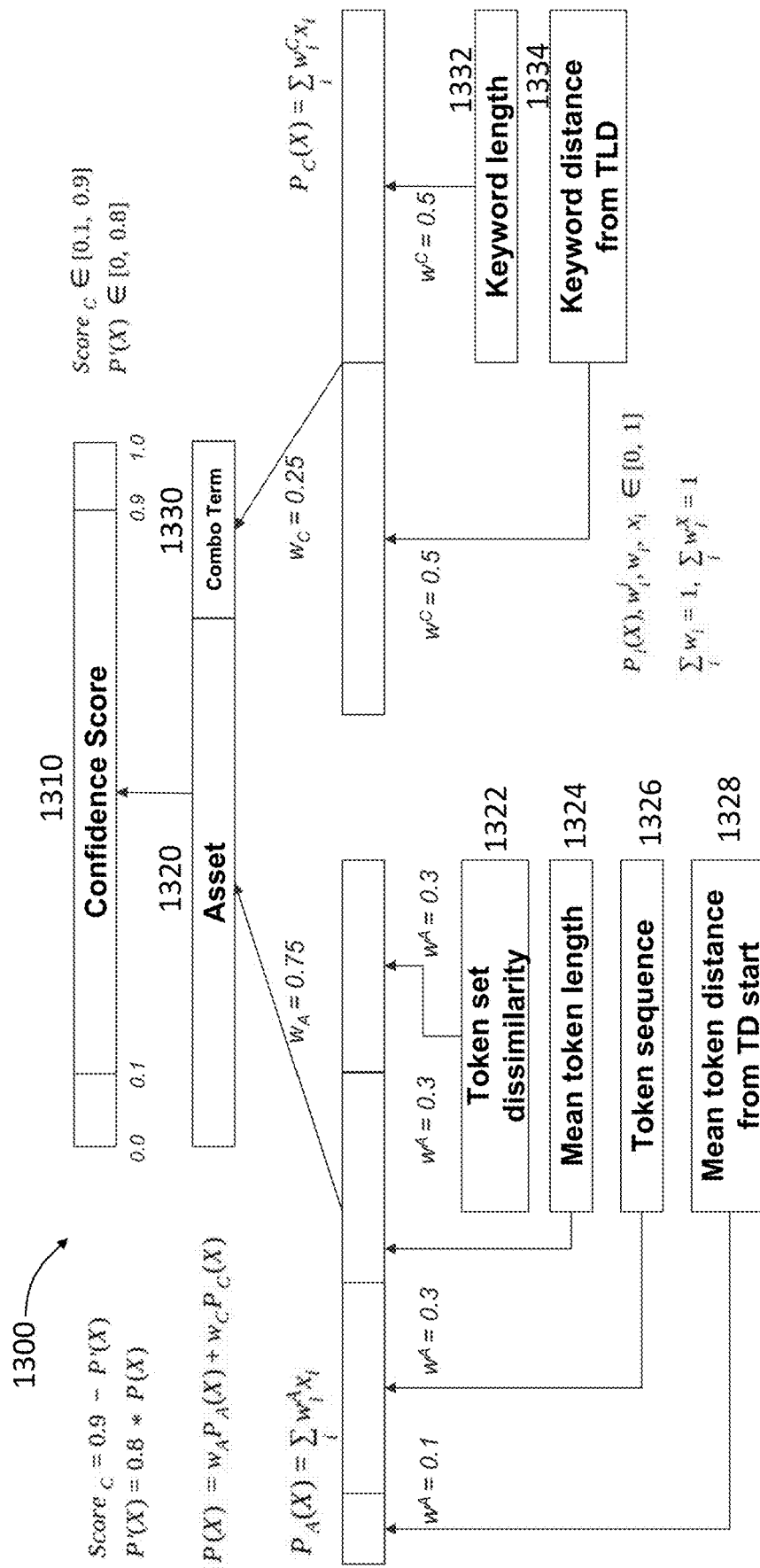
FIG. 9 is a diagram illustrating a method of calculating confidence scores based on detection of combo-squat including fixed keywords, according to an embodiment.
Figure 10:
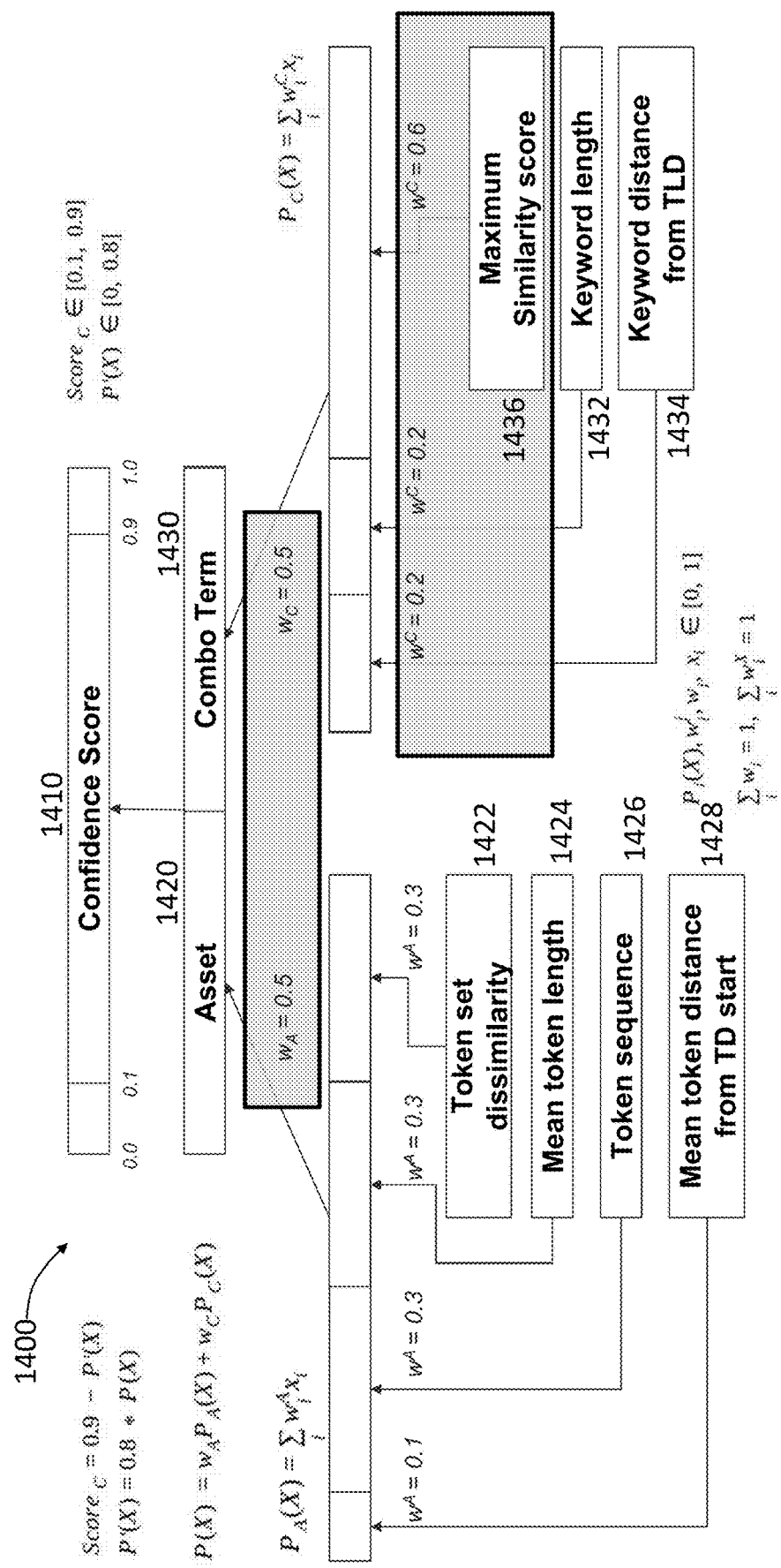
FIG. 10 is a diagram illustrating a method of calculating confidences scores based on detection of combo-squat including semantically similar words, according to an embodiment.

In some embodiments, the confidence score of combo-squatting can be calculated using Equation (1) below:

$$\text{Score}_C = 0.9 - P'(X) \quad \text{Score}_C \in [0.1, 0.9] \tag{1}$$

$$P'(X) = 0.8 * P(X) \quad P'(X) \in [0, 0.8]$$

$$P(X) = \sum_i w_i x_i \quad P(X), w_i, x_i \in [0, 1]$$

where P(x) is a penalty function, P'(x) is a calibrated penalty function, $w_i$ is the weight of factor $x_i$, and $x_i$ is factor i of input X. FIGS. 9-10 are diagrams illustrating the scoring of combo-squatting using Equation (1) above.

FIG. 9 is a diagram illustrating a method 1300 of calculating confidence scores based on detection of combo-squat including fixed keywords, according to an embodiment. As used herein, fixed keywords include keywords that are applicable to any business operating online, such as "portal" or "employees". In the method 1300, the penalty function of a confidence score 1310 is calculated as a weighted average of a first penalty function $P_A(X)$ of an asset score 1320 and a second penalty function $P_C(X)$ of a combo score 1330, i.e., $P(X)=w_A*P_A(X)+w_C*P_C(X)$, where $w_A$ and $w_C$ are weights. For combo-squatting involving fixed keywords, $w_A$ is 0.75 and $w_C$ is 0.25. In some embodiments, the values of the weights $w_A$ and $w_C$ can be developed and tested based on labelled training data sets and known examples.

The first penalty function $P_A(X)$ is calculated via:

$$P_A(X) = \sum_i w_i^A x_i \quad (2)$$

And the second penalty function $P_C(X)$ is calculated via:

$$P_C(X) = \sum_i w_i^C x_i \quad (3)$$

The calculation of the first penalty function $P_A(X)$ involves four factors: token set dissimilarity 1322, mean token length 1324, token sequence 1326, and mean token distance from TD start 1328. The token set dissimilarity 1322 is calculated via $f_{JD}(\{tkn_m\}+\{kw\}, \{tkn_{TD}\}+\{tkn_A\})$. Here, $f_{JD}$ (s1, s2) is the Jaccard distance between two sets s1 and s2, tknx means token(s) in X, (e.g., $tkn_m$ means matched token, $tkn_{TD}$ means target domain, $tkn_A$ means asset, and kw means keywords). In addition, the bracket represents sets and the bracket [ ] represents arrays. In some instances, the closer the tokens are from the TLD (end of TD), the higher the penalty. The mean token length 1324 can be calculated via $1-\min(10, \text{avg}([\text{len}(tkn_m)]))*0.1$, where $tkn_m$ means matched domain, the ave([X]) is to calculate the average of the array X, and len(X) is to calculate the length of X. In some instances, a shorter token length can lead to a higher penalty function. The token sequence 1326 can be calculated by $1-(0.5*\text{consec}([tkn_m], TD)+0.5*\text{in\_order}([tkn_m], TD))$. Here consec([X], TD)=1 if tokens in X are consecutive in TD, 0 otherwise, TD means target domain. In addition, in_order([x], TD)=1 if tokens in x are in order in TD, 0 otherwise. The mean token distance from TD 1328 can be calculated via $\min(5, \text{avg}([lpos(tkn_m, TD)]))*0.2$. Here lpos (x, y) is to calculate the left index of x in y.

In some embodiments, the weight for these four factors is 0.1, 0.3, 0.3, and 0.3, respectively. The calculation of the second penalty function $P_C(X)$ involves two factors: keyword length 1332 and keyword distance from the top-level domain (TLD) 1334, each of which has a weight of 0.5.

In some embodiments, the keyword length 1332 can be calculated as $1-\min(10, \text{len}(kw))*0.1$, where len(kw) is the length of the keywords. In some instances, a shorter keyword can result in a higher penalty function. In some embodiments, the keyword distance from the TLD 1334 can be calculated as $\min(5, rpos(kw, TD))*0.2$, where rpos(x, y) is to calculate the right index of x in y. In some instances, the further the keyword from the TLD (end of TD), the higher the penalty.

FIG. 10 is a diagram illustrating a method 1400 of calculating confidence scores based on detection of combo-squat including semantically similar words, according to an embodiment. As used herein, semantically similar keywords include keywords that are related to a client's sector. For example, for a banking client, semantically similar keywords can include "finance" or "trading", and semantically similar keywords for a retail client can include "store" or "shop". In the method 1400, the penalty function of a confidence score 1410 is calculated as a weighted average of a first penalty function $P_A(X)$ of an asset score 1420 and a second penalty function $P_C(X)$ of a combo score 1430, i.e., $P(X)=w_A*P_A(X)+w_C*P_C(X)$, where $w_A$ and $w_C$ are weights. For combo-squatting involving semantically similar words, $w_A$ is 0.5 and $w_C$ is 0.5.

Equations (2) and (3) above are also used to calculate the first penalty function $P_A(X)$ and the second penalty function $P_C(X)$. More specifically, the calculation of the first penalty function $P_A(X)$ involves four factors: token set dissimilarity 1422, mean token length 1424, token sequence 1426, and mean token distance from TD start 1428. The weight for these four factors is 0.1, 0.3, 0.3, and 0.3, respectively. The calculation of the second penalty function $P_C(X)$, however, involves three factors: keyword length 1432 and keyword distance from the TLD 1434, and maximum similarity score 1436. The weight for each of these three factors is 0.2, 0.2, and 0.6, respectively. In some embodiments, the maximum similarity score 1436 can be calculated via $1-\max(0.5, \max([scores_{ML}]))$, where $scores_{ML}$ is (cosine) similarity score from word vectors with values in [−1, 1]. In some instances, $Scores_{ML}$ is meaningful between [0.5 and 1] and a lower similarity score can lead to a higher penalty function.

Figure 11:
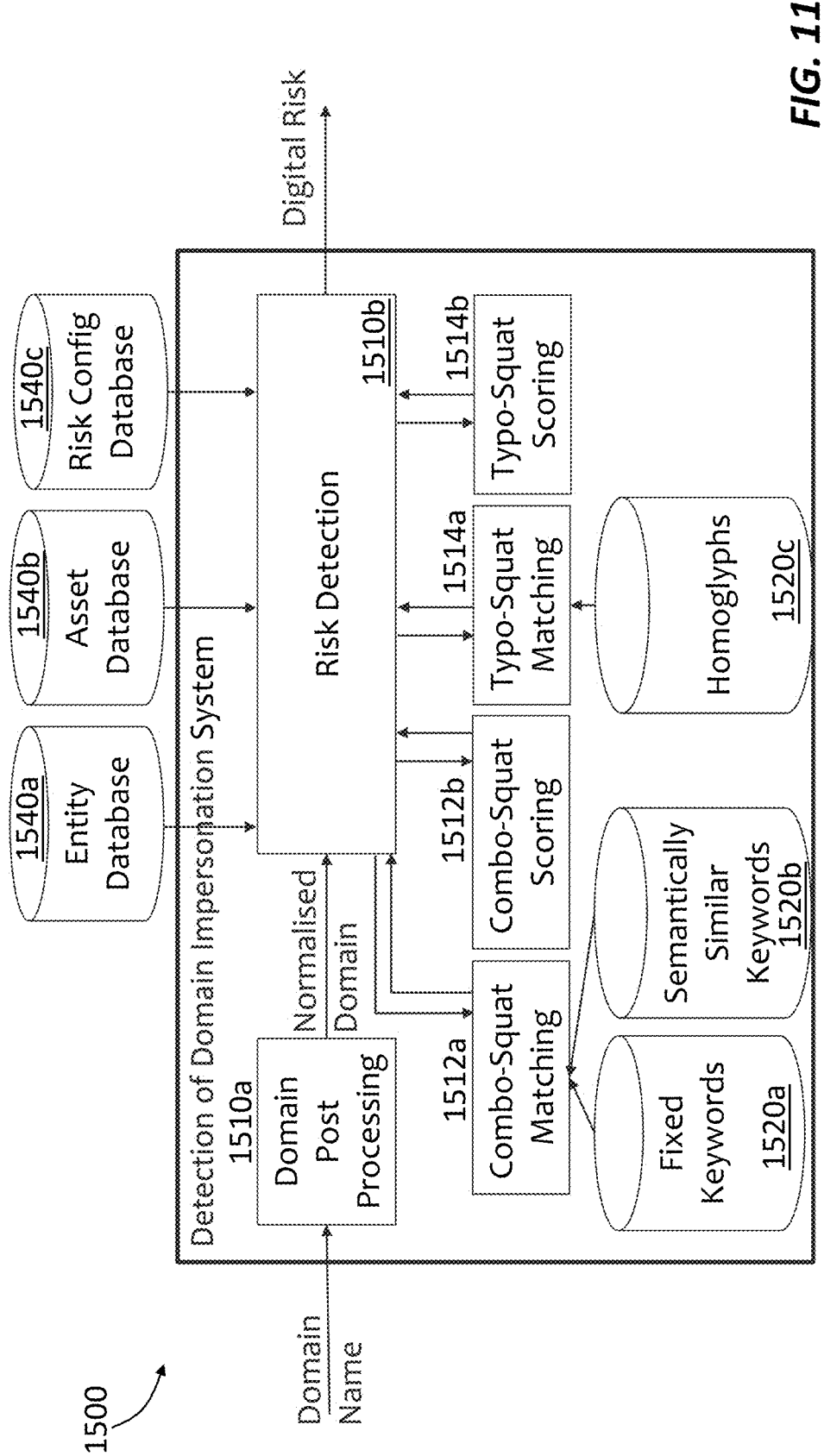
FIG. 11 shows a schematic of a system for calculating confidence of domain name impersonation, according to an embodiment.

FIG. 11 is a schematic illustration of a system 1500 for calculating confidence of domain name impersonation, according to an embodiment. While system 1500 is shown as a separate system, in some implementations the functions and/or structure of the system 1500 can be performed by and/or integrated into system 600 shown and described above with respect to FIG. 6. For example, processing units 1510a and 1510b (described in further detail herein) can be integrated into and/or part of processing unit 610 and/or any of the databases 1520a-1520c and 1540a-1540c (described in further detail herein) can be integrated into and/or part of any of databases 620, 630a-630c and 640a-640c shown and described with respect to FIG. 6. Similarly, the functions and/or processes described as being executed an/or performed by processing units 1510a and 1510b can be executed and/or performed by processing unit 610.

The system 1500 includes a first processing unit 1510a for domain name processing and a second processing unit 1510b for risk detection (i.e., detecting risk of domain name impersonation). In some embodiments, the domain name processing performed by the first processing unit 1510a includes converting an input domain name into a normalized domain name (e.g., step 1120 illustrated in FIG. 7). In some embodiments, the risk detection performed by the second processing unit 1510b includes determining whether the input domain name is excluded for impersonation analysis and/or calculating a confidence score of domain name impersonation (e.g., step 1130 and/or step 1140 illustrated in FIG. 7).

Although two processing units 1510a and 1510b (collectively referred to as processing units 1510) are illustrated in FIG. 11, in practice, any other number of processors can be used to perform the same functions. For example, one processor can be used to perform both domain name processing and risk detection. In another example, the domain name processing and/or the risk detection can be performed using parallel computing, which can involve multiple processors.

The second processing unit 1510b is operatively coupled to and/or executes a first module 1512a for combo-squat matching and a second module 1512b for combo-squat scoring. In some embodiments, the first module 1512a is configured to detect possible combo-squatting in the input domain name and the second module 1512b is configured to calculate a confidence score of the detected combo-squatting.

The second processing unit 1510b is also operatively coupled to and/or executes a third module 1514a for typo-squat matching and a fourth module 1514b for typo-squat scoring. In some embodiments, the third module 1514a is configured to detect possible typo-squatting in the input domain name and the fourth module 1514b is configured to calculate confidence score of the detected typo-squatting.

The first module 1512a is operatively coupled to two databases: a first database 1520a configured to store fixed keywords for analysis of combo-squatting and a second database 1520b configured to store semantically similar keywords for analysis of combo-squatting. In operation, the first module 1512a can retrieve fixed keywords from the first database 1520a and/or retrieve semantically similar keywords from the second database 1520b to detect possible combo-squatting in the input domain name.

The third module 1514a is operatively coupled to a third database 1520c configured to store one or more homoglyph maps. In operation, the third module 1514b can retrieve the stored homoglyph map to detect possible typo-squatting in the input domain name.

The second processing unit 1510b is further operatively coupled to three databases, including database 1540a configured to store entity information, database 1540b configured to store asset information, and database 1540c configured to store risk configuration data. The entity information can include attributes of each subscribing entity (e.g., client of a service provider who performs analysis and scoring of digital risk). The asset information can include asset data described herein (e.g., brand information, company information, domain information, etc.). The risk configuration data is substantially identical to the risk configuration data described above with reference to FIG. 7. For example, the risk configuration data includes criterions employed by each entity to exclude certain asset from analysis of domain name impersonation.

Although multiple databases (e.g., 1520a to 1520c and 1540a to 1540c) are illustrated in FIG. 11, these databases may be consolidated into a single database (or any number of databases) and stored in one (or more) memory. In some implementations, the memory can be a random access memory (RAM), a memory buffer, a hard drive, a read-only memory (ROM), an erasable programmable read-only memory (EPROM), and/or the like. The databases can be any suitable database such as, for example, a relational database, an object database, an object-relational database, a hierarchical database, a network database, an entity-relationship database, a structured query language (SQL) database, an extensible markup language (XML) database, digital repository, a media library, a cloud server or storage, and/or the like.

In some implementations, the processing units 1510 and the databases are disposed at the same location, and the system 1500 can form a server. In some implementations, the processing units 1510 can be remote from one or more of the databases and communicate with the database via a network. The network can be any type of network such as, for example, a local area network (LAN), a virtual network such as a virtual local area network (VLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network can be implemented as a wireless local area network (WLAN) based on the Institute of Electrical and Electronics Engineers (IEEE) 802.11 standards (also known as "WiFi®"). Moreover, the network can include a combination of networks of any type such as, for example, a LAN or WLAN and the Internet.

The processing units 1510a and 1510b can be any suitable processing device(s) configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a personal computer (PC) application, a mobile application, an internet web browser, a cellular and/or wireless communication (via a network), and/or the like.

In some implementations, the processing units 1510a and 1510b can be configured as a server or group of servers, a network management device, a personal computer (PC), a processing unit, and/or the like. In some embodiments, the processing units 1510a and 1510b can be configured as a portable device and communicate with the databases via any suitable network described above. Examples of portable devices include a personal computer (PC), a laptop, a convertible laptop, a tablet, a personal digital assistant (PDA), a smartphone, a wearable electronic device (e.g., a smart watch, etc.), and/or the like.

In some embodiments, the system 1500 further includes a communication interface (not shown in FIG. 11) to receive information related to the digital risk and/or deliver the risk detection outcome and/or the risk detection signal. The communication interface can be any suitable module and/or device that can place the system 1500 in communication with external sources, such as one or more network interface cards or the like. Such a network interface card can include, for example, an Ethernet port, a WiFi® radio, a Bluetooth® radio (e.g., a Bluetooth® antenna), a near field communication (NFC) radio, and/or a cellular radio. As such, the communication interface can send signals to and/or receive signals from the processing units 1510a and 1510b. In some instances, the communication interface of the system 1500 can include multiple communication interfaces (e.g., a WiFi® communication interface to communicate with the one external source and a Bluetooth® communication interface to communicate with another external source).

Figure 12:
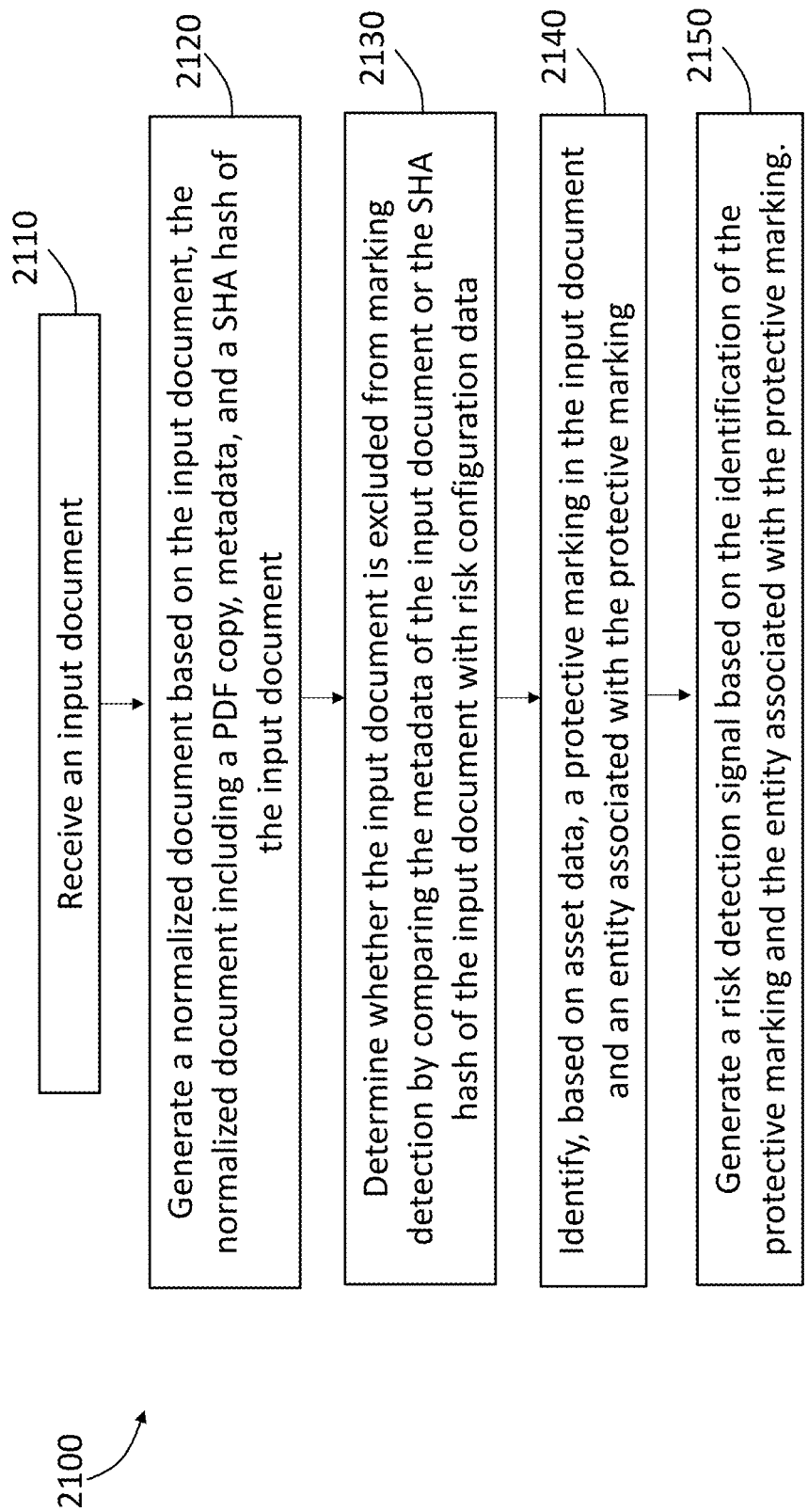
FIG. 12 is a flowchart illustrating a method of detecting protective marking in documents, according to an embodiment.

FIG. 12 is a flowchart illustrating a method 2100 for detecting protective marking in documents, according to an embodiment. In some implementations, the method 2100 can be used with other systems and/or methods described herein to calculate a risk associated with marked documents. The method 2100 includes, at 2110, receiving an input document. In some instances, the input document includes an online document in electronic form (e.g., digital form). In some instances, the input document can include scanned copies of hard copy documents. The input document can include any appropriate type of documents, such as reports, letters, books, emails, minutes, memoranda, films, charts, tapes, and images, among others.

In some embodiments, receiving the input document at 2110 also includes searching for documents on the Internet and then retrieving the search results based on certain search conditions. For example, the search can be conducted to search for documents that bear the name of a business entity. In some embodiments, the search can be conducted to search for documents that bear the logo of a business entity. In some embodiments, the search can be conducted based on the type of document at issue (e.g., search for emails only). Any other attribute of the business entity can also be used (see, e.g., description below about asset data).

In some embodiments, the search can be conducted over the entire Internet. In some embodiments, the search can be conducted within one or more target domains. For example, the search can be limited within a suspect file sharing site that might share confidential information of business entities.

In some embodiments, the search can be limited to documents in a certain language (e.g., English only or Spanish only). In some embodiments, the search can be limited to documents that were created within a predetermined period of time. For example, the search can be conducted to look for documents that were created less than 1 year ago. Any other appropriate search conditions can also be used.

At 2120 in the method 2100, the received input document is converted into a normalized document that includes: (i) a portable document format (PDF) copy of the input document; (ii) metadata of the input document; and (iii) an SHA hash of the input document. The metadata of the input document can include, for example, administrative metadata, descriptive metadata, preservation metadata, technical metadata, and/or use metadata.

Administrative metadata as used herein includes metadata that is used in managing and administering the document, such as acquisition information, rights and reproduction tracking, documentation of legal access requirements, location information (e.g., domain location), and selection criteria for digitization, among others. Descriptive metadata is used to identify and describe the document, such as cataloging records, finding aids, differentiations between versions (e.g., version/revision history), specialized indexes, curatorial information, hyperlinked relationships between resources, and annotations by creators and users, among others. Preservation metadata is related to the preservation management of documents, such as documentation of physical condition of resources, documentation of actions taken to preserve physical and digital versions of resources (e.g., data refreshing and migration), and documentation of any changes occurring during digitization or preservation, among others. Technical metadata is related to how a system functions or metadata behaves, such as hardware and software documentation, technical digitization information (e.g., formats, compression ratios, scaling routines), tracking of system response times, and authentication and security data (e.g., encryption keys, passwords), among others. Use metadata includes metadata about the level and type of use of documents, such as circulation records, physical and digital exhibition records, use and user tracking, content reuse and multi-versioning information, search logs, and rights metadata, among others.

In some embodiments, the SHA hash of the input document includes an SHA-1 hash. In some embodiments, the SHA hash of the input document can include an SHA-2 hash or an SHA-3 hash. In some embodiments, any other appropriate type of cryptographic hash functions can also be used to replace or supplement the SHA hash.

The method 2100 also includes, at 2130, determining whether the input document is excluded from marking detection by comparing the metadata of the input document or the SHA hash of the input document with risk configuration data. In some embodiments, the risk configuration data is stored in a database operated and managed by a service provider who performs the method 2100. The risk configuration data can include a list of criterions to exclude certain documents from further processing. For example, the risk configuration data can include: (i) types of documents to be excluded from marking detection; (ii) document hosting domains to be excluded from marking detection; and (iii) SHA hashes of documents to be excluded from marking detection.

In addition, each entity can have its own risk configuration data, i.e., each entity can decide which documents to exclude from marking detection. The database operated by the service provider can include risk configuration data associated with each entity that provides its risk configuration data to the service provider. When implementing the method 2100, a processor can be configured to select the proper set of risk configuration data at 2130.

At 2140 of the method 2100, in the event that the input document is not excluded from marking detection, a protective marking in the input document and an entity associated with the protective marking are identified based on asset data. In some embodiments, the risk configuration data is stored in a database operated and managed by the service provider. In addition, each entity that subscribes to the marking detection services can have its own asset data. In some embodiments, the asset data includes, for example, (i) brand information; (ii) company name information; (iii) domain information; and/or (iv) a protective marking scheme associated with each entity.

The brand information in the asset data can include, for example, the name of the brand, the logo representing the brand, and the color pallet of the logo. One entity can have one or more brands associated with that entity. The company name information in the asset data can include, for example, the name of the company (e.g., in text), the logo of the company (e.g., in images), and/or the color pallet of the logo. The domain information of an entity can include, for example, the name and/or address of each domain associated with the entity. The domain can be owned by the entity, operated by the entity, and/or leased by the entity. In some instances, a domain can be operated by an agent on behalf of the entity.

The protective marking scheme of an entity can include, for example, the manner in which the entity marks its documents. In some embodiments, the protective marking scheme also includes a classification scheme employed by each entity. In some instances, some entities use abbreviated security classification, i.e., each level of classification is marked using an abbreviation. For example, (U) can be used to mark unclassified information, (IC) can be used to mark in confidence information, (Sen) can be used to mark sensitive information, (R) can be used to mark restricted information, (C) can be used to mark confidential information, (S) can be used to mark secret information, and (TS) can be used to mark top secret information.

In some instances, some entities use a color coding for protective marking. For example, red color can be used to mark top secret information, blue color can be used to mark secret information, green color can be used to mark confidential information, and black color can be used to mark other protected information (e.g., restricted information, sensitive information, and in confidence information). In some instances, the markers used for the protective marking can include letters in the corresponding color (e.g., "TOP SECRET" in red). In some instances, the markers used for the protective marking can include any other object in the corresponding color (e.g., a rectangle in red to mark top secret information).

In some embodiments, the protective marking scheme includes information about the location of protective marking for each entity. For example, some entities place protective markings at the top and/or bottom of each page of a document. In some instances, the protective marking can be placed on the cover page of the document as well. In some instances, the protective marking can be configured as a watermark and placed in the middle of each page.

In some instances, different paragraphs in the same page can include information of different classifications. In these instances, each paragraph can be marked accordingly. For example, markers can be placed at the beginning of each paragraph. Once such paragraph marking scheme is used, each paragraph can have a corresponding marker in order to avoid confusion.

At 2140, the asset data is used for identifying protective marking and the associated entity. In some embodiments, the identification can be performed by searching the brand name within the normalized document. In some embodiments, the identification can be performed by searching the company name within the normalized document. In some embodiments, the identification can be performed by searching the domain name within the metadata of the input document (i.e., determining whether the input document is from a domain associated with the entity).

In some embodiments, the identification of protective marking and/or the associated entity can be achieved based on the protective marking scheme of an entity. For example, if the entity uses abbreviation for protective marking, the identification can be achieved by searching for the specific abbreviations (e.g., (C), (TS), etc.). In some instances, the entity uses color coding for protective marking, and the identification can carry out color detection and/or image recognition to detect the corresponding markers (e.g., a red rectangle). In some implementations, the format and/or style of the protective markings can also be used to identify the entity.

In some instances, the entity places protective markings at the bottom of each page of its documents. In these instances, the search for protective marking can be limited to the bottom of each page. In some instances, watermarks are used for protective marking, and accordingly, the identification can be conducted within metadata of the input document. Any other proper search conditions can also be used to facilitate the identification of protective marking and the associated entity.

At 2150, based on the identification of the protective marking and the entity associated with the protective marking, a risk detection signal is generated. In some embodiments, the risk detection signal can be configured in the JavaScript Object Notation (JSON) format that encapsulates the detail of the detected risk. For example, the risk can include which assets have been matched to the input document in order to consider the input document as a risk. The risk can then be programmatically ingested by other services (e.g., risk scoring service). In some embodiments, the risk detection signal is also sent to the entity that is associated with the input document. In some embodiments, the risk detection signal represents a risk that confidential information of the entity is leaked. For example, the input document is retrieved from a file sharing domain that is open to the public and protective marking representing top secret information is detected in the input document. In this instance, the risk detection signal can alert the entity that information leakage may have occurred. Accordingly, the entity can take preventive/remedial measures. For example, the entity can conduct further investigation into the possible leakage. The entity can also improve its information management system to increase it security. The entity can also report the leakage to law enforcement agencies.

In some embodiments, the risk detection signal can represent a risk that the input document is a counterfeit document. For example, some protective markings are detected in the input document and purportedly associated with an entity. However, the detected protective marking is not exactly in accordance with the protective marking scheme employed by the entity. Therefore, there is a risk that the input document is a counterfeit. In this instance, the risk detection can also alert the entity to take preventive/remedial measures.

Figure 13:
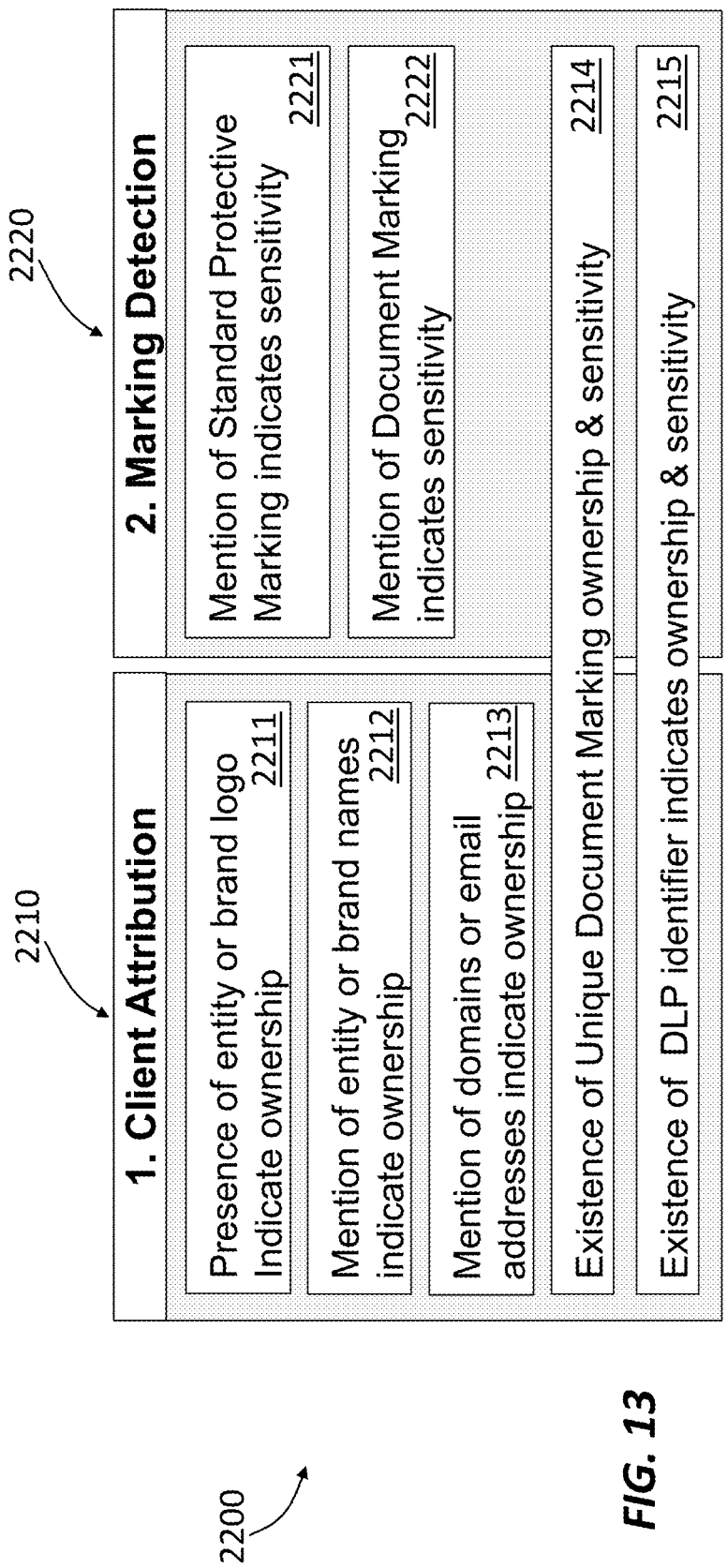
FIG. 13 illustrates a method of detecting protective marking in a document and an identity of an associated entity, according to an embodiment.

FIG. 13 illustrates a method 2200 detecting protective marking in an input document and an identity of an associated entity, according to an embodiment. In some embodiments, the method 2200 can be used to carry out step 2140 in the method 2100. The method 2200 includes client attribution 2210 and marking detection 2220. Client attribution 2210 is to identify the entity that is associated with the input document, and marking detection 2220 is to detect protective marking(s) contained in the input document. While shown as two separate steps, in some instances marking detection 2220 can also be used in client attribution 2210.

In client attribution 2210, the method 2200 includes searching for and detecting several factors, including the logo of the entity or the logo of brands owned by the entity at 2211. This search can be achieved via, for example, image recognition techniques. The client attribution 2210 also includes searching for and detecting the name of the entity or the name of brands owned by the entity. This search can be achieved via, for example, keyword search and/or natural language processing. The client attribution 2210 can also be facilitated by searching for and detecting domain names and/or email addresses within the input document, i.e., presence of the entity's domain name and/or email addresses increase the likelihood that the input document is associated with the entity.

In marking detection 2220, the method 2200 includes searching for and detecting standard protective marking based on the protective marking scheme employed by the entity, at 2221. In some instances, the mentioning of document marking, in itself, can also indicate that the document includes sensitive information (at 2222). In these instances, the input document can be placed under more strict scrutiny. For example, a human inspector can manually inspect the input document to determine whether there is any sensitive information in the document and accordingly determine the risk of information leakage and/or document counterfeiting.

In some embodiments, the protective marking can also be used to facilitate the client attribution 2210. For example, a unique protective marking can be used to indicate the ownership of the input document (at 2214). The marking can also be used to show that the input document includes sensitive information. In some instances, detection of a data loss prevention (DLP) identifier can also be used for both client attribution 2210 and marking detection 2220 (at 2215).

Figure 14:
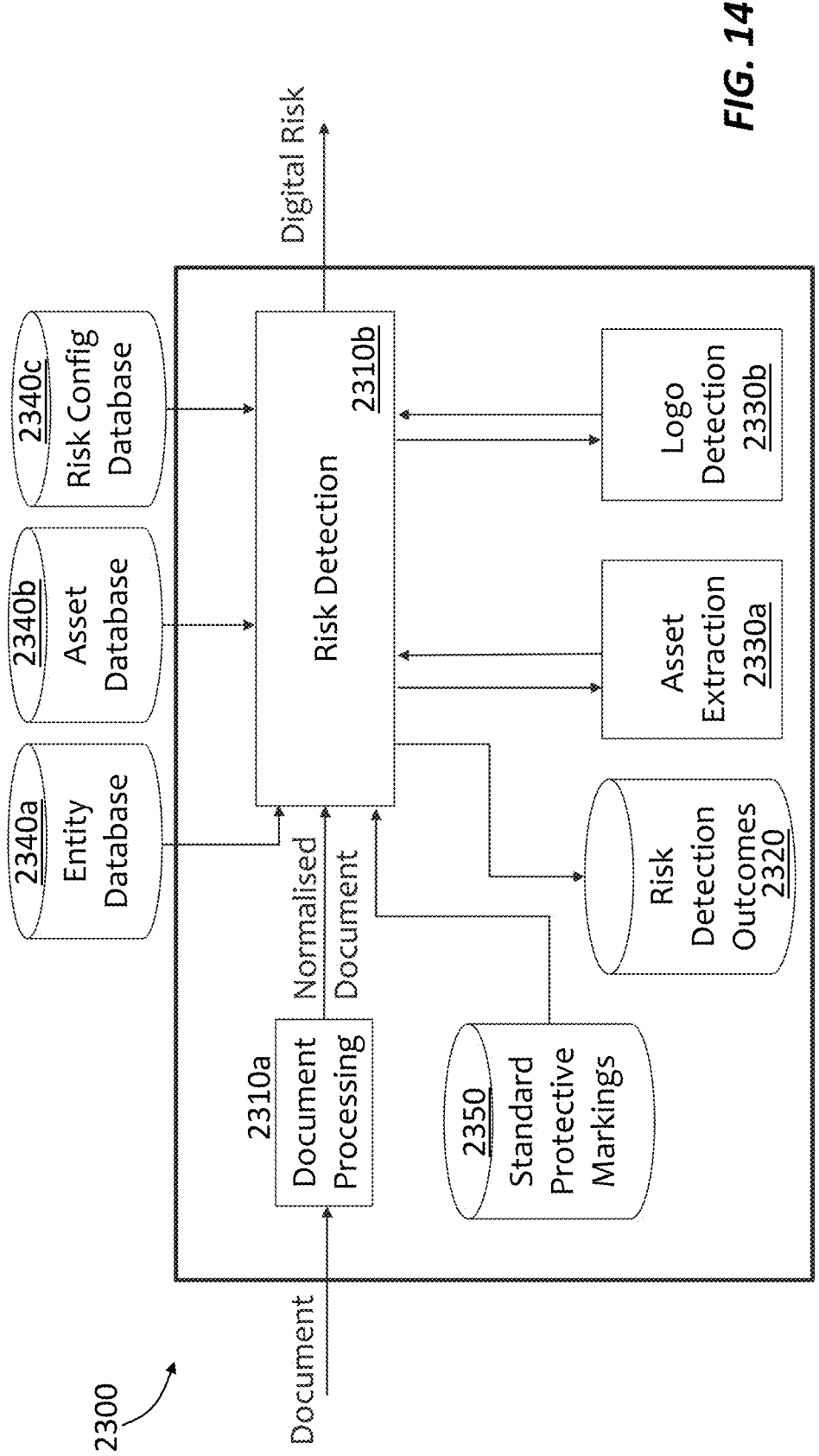
FIG. 14 shows a schematic of a system for searching for and detecting protective marking in documents, according to an embodiment.

FIG. 14 is a schematic illustration of a system 2300 for searching for and detecting protective marking in documents, according to an embodiment. While system 2300 is shown as a separate system, in some implementations the functions and/or structure of the system 2300 can be performed by and/or integrated into system 600 shown and described above with respect to FIG. 6. For example, processing units 2310*a* and 2310*b* (described in further detail herein) can be integrated into and/or part of processing unit 610 and/or any of the databases 2320, 2330a, 233b, 2340a, 2340b and 2340c (described in further detail herein) can be integrated into and/or part of any of databases 620, 630a-630c and 640a-640c shown and described with respect to FIG. 6. Similarly, the functions and/or processes described as being executed an/or performed by processing units 2310a and 2310b can be executed and/or performed by processing unit 610.

The system 2300 includes a first processing unit 2310a for document processing and a second processing unit 2310b for risk detection. In some embodiments, the document processing performed by the first processing unit 2310a includes converting an input document into a normalized document and/or extracting metadata of the input document (e.g., step 2120 and/or step 2130 illustrated in FIG. 12). In some embodiments, the risk detection performed by the second processing unit 2310b includes identifying protective markings in the input document and the entity that is associated with the protective marking (e.g., step 2140 illustrated in FIG. 12). Although two processing units 2310a and 2310b (collectively referred to as processing units 2310) are illustrated in FIG. 14, in practice, any other number of processors can be used to perform the same functions. For example, one processor can be used to perform both document processing and risk detection. In another example, the document processing and/or the risk detection can be performed using parallel computing, which can involve multiple processors.

The second processing unit 2310b is operatively coupled to and/or configured to execute a first module 2330a for asset extraction and a second module 2330b for logo detection. In some embodiments, the first module 2330a is configured to search for and detect attributes of an entity, such as the name of the entity, the name of the brands owned by the entity, and domain names associated with the entity. In some embodiments, the second module 2330b is configured to search for and detect logos associated with the entity, such as logos of the entity (or subsidiaries/parents of the entity), logos of brands owned by the entity, or any other logos associated with the entity. In some implementations, the first module 2330a and/or the second module 2330b can be hardware modules and/or software modules (e.g., code stored in memory and executed by hardware (e.g., the second processing unit 2310b)).

The second processing unit 2310b is also operatively coupled to a second set of databases, including database 2340a configured to store entity information, database 2340b configured to store asset information, and database 2340c to store risk configuration data. The entity information can include attributes of each subscribing entity (e.g., client of a service provider who performs analysis and scoring of digital risk). The asset information can include asset data described herein (e.g., brand information, company information, domain information, email addresses, etc.). The risk configuration data is substantially identical to the risk configuration data described above with reference to FIG. 12. For example, the risk configuration data includes criterions employed by each entity to exclude certain documents from risk detection.

The system 2300 also includes a risk detection outcomes database 2320 configured to store risk outcomes. For example, when a risk detection is completed (e.g., completion of step 2140 in the method 2100), the outcome is stored in the database 2320. In some embodiments, the stored outcomes can be used, for example, to monitor the risk of information leakage for a particular entity. For example, if there is an increasing number of risk outcomes associated with an entity, the risk detection signal sent to the entity can be adjusted accordingly taking into account the observed trend. In other words, one type of risk detection signal can be generated if the risk detection outcome is based on an isolated incident, and a different type of risk detection signal (e.g., with enhanced alert) can be generated if the same risk detection outcome is based on a pattern of similar risk detection outcomes observed recently (e.g., within a given predetermined time period).

Although multiple databases (e.g., 2320, 2340a to 2340c, and 2350) are illustrated in FIG. 14, these databases may be consolidated into a single database and stored in one (or more) memory. In some embodiments, the memory can be a random access memory (RAM), a memory buffer, a hard drive, a read-only memory (ROM), an erasable programmable read-only memory (EPROM), and/or the like. The databases can be any suitable database such as, for example, a relational database, an object database, an object-relational database, a hierarchical database, a network database, an entity-relationship database, a structured query language (SQL) database, an extensible markup language (XML) database, digital repository, a media library, a cloud server or storage, and/or the like.

In some embodiments, the processing units 2310a and 2310b and the databases are disposed at the same location, and the system 2300 can form a server. In some embodiments, the processing units 2310 can be remote from one or more of the databases and communicate with the database via a network. The network can be any type of network such as, for example, a local area network (LAN), a virtual network such as a virtual local area network (VLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network can be implemented as a wireless local area network (WLAN) based on the Institute of Electrical and Electronics Engineers (IEEE) 802.11 standards (also known as "WiFi®"). Moreover, the network can include a combination of networks of any type such as, for example, a LAN or WLAN and the Internet.

The processing units 2310a and 2310 b can be any suitable processing device configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

In some embodiments, the processing units 2310 can be configured as a server or group of servers, a network management device, a personal computer (PC), a processing unit, and/or the like. In some embodiments, the processing unit 2310a and 2310b can be configured as a portable device and communicate with the databases via any suitable network described above. Examples of portable devices include a personal computer (PC), a laptop, a convertible laptop, a tablet, a personal digital assistant (PDA), a smartphone, a wearable electronic device (e.g., a smart watch, etc.), and/or the like.

In some embodiments, the system 2300 further includes a communication interface to receive information related to the digital risk and/or deliver the risk detection outcome and/or the risk detection signal. The communication interface can be any suitable module and/or device that can place the system 2300 in communication with external sources, such as one or more network interface cards or the like. Such a network interface card can include, for example, an Ethernet port, a WiFi® radio, a Bluetooth® radio (e.g., a Bluetooth® antenna), a near field communication (NFC) radio, and/or a cellular radio. As such, the communication interface can send signals to and/or receive signals from the processing units 2310*a* and 2310*b*. In some instances, the communication interface of the system 2300 can include multiple communication interfaces (e.g., a WiFi® communication interface to communicate with the one external source and a Bluetooth® communication interface to communicate with another external source).

Figure 15:
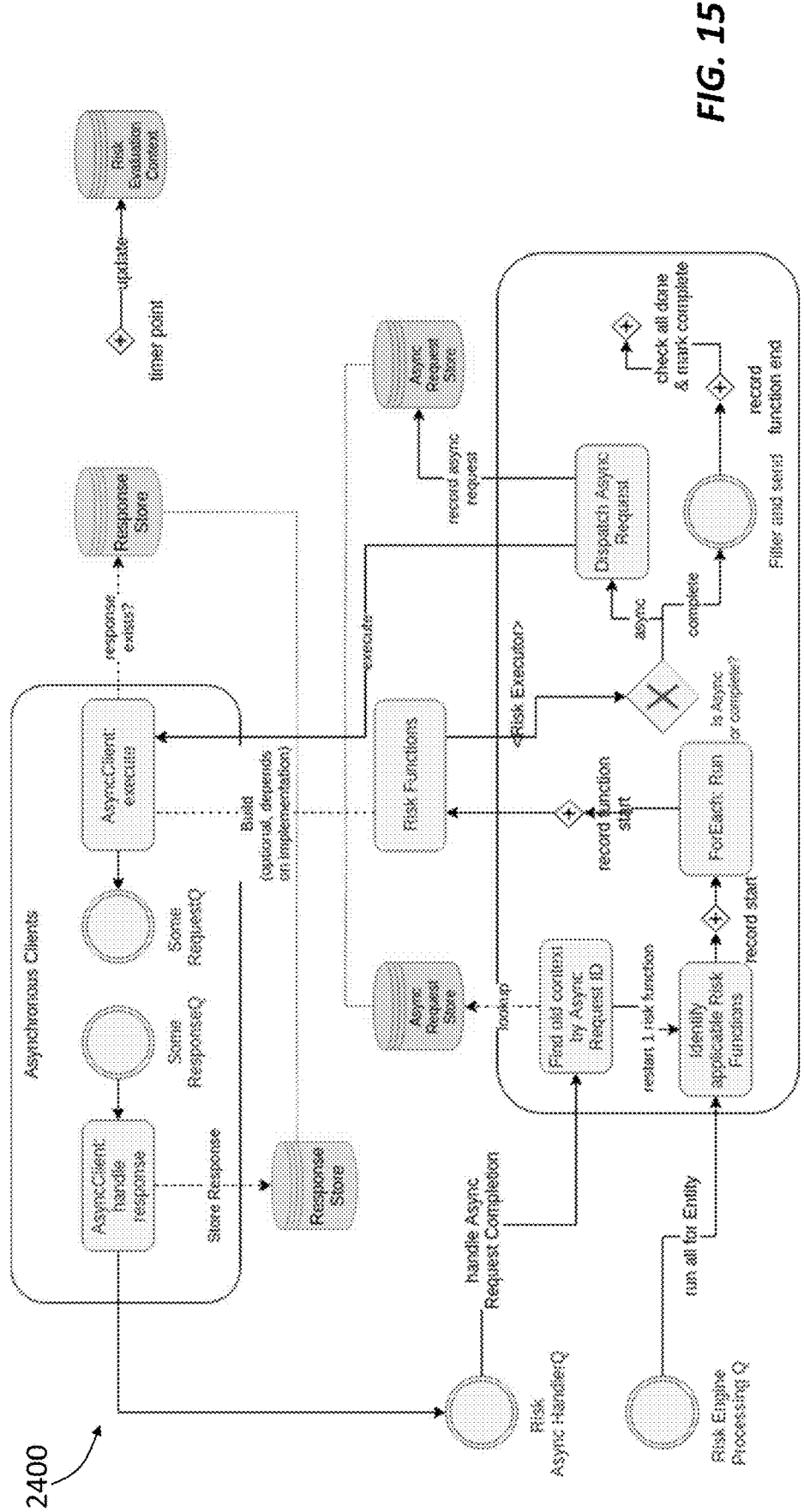
FIG. 15 is a flowchart illustrating a method of risk detection via synchronous and asynchronous flows, according to embodiment.

FIG. 15 is a flowchart illustrating a method 2400 of risk detection via synchronous and asynchronous flows, according to embodiment. The method 2400 uses queues and data stores for the generic detection of digital risks (e.g., digital risk associated with documents and/or other non-document information). In the context of the detection of marked documents, logo detection is performed asynchronously.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware sections may include, for example, a general-purpose processor, a field programmable gate array (FPGA), and/or an application specific integrated circuit (ASIC). Software sections (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   receiving information associated with a digital risk;
   retrieving data based on the information associated with the digital risk, the data including: (i) a business value of an asset related to the digital risk; (ii) an attribute of an entity affected by the digital risk; and (iii) nature and confidence information associated with detection of the digital risk; and
   calculating, using a processor, a risk score based on the retrieved data, calculating the risk score including:
      calculating a risk likelihood score based on the nature and confidence information associated with the detection of the digital risk;
      calculating a risk impact score based on: (i) a likely threat score (LTS) representing a likelihood that a threat associated with the digital risk occurs; and (ii) an asset threat score (ATS) representing a consequence of an occurrence of the threat, wherein calculating the risk impact score includes calculating: risk impact score=ATS×AW+LTS×RIW, wherein AW is an asset weight and RIW is risk impact weight, and wherein calculating the LTS is based on the attribute of the entity affected by the digital risk; and
      calculating the risk score based on the risk likelihood score and the risk impact score.

2. The method of claim 1, wherein retrieving the data includes at least one of retrieving the data from a memory operatively coupled to the processor or receiving at least part of the data from the entity.

3. The method of claim 1, wherein calculating the ATS includes calculating the ATS based at least on: (i) a criticality score associated with the asset (AScr); (ii) a sensitivity score associated with the asset (ASsen); and (iii) a cost score associated with the asset (AScst).

4. The method of claim 3, wherein the ATS is calculated according to ATS=(TAWcr×AScr)+(TAWsen×ASsen)+(TAWcst×AScst), where TAWcr is a first weight, TAWsen is a second weight, and TAWcst is a third weight, the first weight, the second weight, and the third weight are stored in a memory operatively coupled to the processor, and calculating the ATS further includes retrieving, by the processor, the first weight, the second weight, and the third weight from the memory.

5. The method of claim 1, further comprising:
   comparing the risk score with other risk scores of previous digital risks stored in a database, the other risk scores being related to the entity; and
   updating the database if the risk score is different from the other risk scores.

6. The method of claim 1, wherein the digital risk is associated with at least one of document marking or domain impersonation.

7. The method of claim 1, further comprising:
   sending the risk score to the entity, the risk score configured to cause the entity to take at least one of a preventive measure or a remedial measure.

* * * * *